US012657536B2

(12) United States Patent
Bonacci

(10) Patent No.: US 12,657,536 B2
(45) Date of Patent: Jun. 16, 2026

(54) ARTIFICIAL INTELLIGENCE DRIVEN USER INTERFACE STRUCTURE GROUNDING FOR AUTOMATED GENERATION OF ACTIONABLE TASKS

(71) Applicant: Microsoft Technology Licensing, LLC, Redmond, WA (US)

(72) Inventor: Francesco Bonacci, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 88 days.

(21) Appl. No.: 18/422,753

(22) Filed: Jan. 25, 2024

(65) Prior Publication Data

US 2025/0245592 A1 Jul. 31, 2025

(51) Int. Cl.
G06Q 10/0631 (2023.01)
G06F 11/3668 (2025.01)
(Continued)

(52) U.S. Cl.
CPC ... G06Q 10/06316 (2013.01); G06F 11/3668 (2013.01); G06F 40/40 (2020.01); G06Q 10/0633 (2013.01); G06V 10/40 (2022.01)

(58) Field of Classification Search
CPC ....... G06Q 10/00–50/00; G06F 1/00–2123/00; G06V 10/00–40/00
(Continued)

(56) References Cited

U.S. PATENT DOCUMENTS 5,621,903 A * 4/1997 Luciw ..................... G06F 9/453
715/708
6,657,643 B1 * 12/2003 Horvitz ................ G06Q 10/109
715/764
(Continued)

FOREIGN PATENT DOCUMENTS

CN 115964027 A 4/2023

OTHER PUBLICATIONS

Wang, Bryan, Gang Li, and Yang Li. "Enabling conversational interaction with mobile ui using large language models." Proceedings of the 2023 CHI Conference on Human Factors in Computing Systems. 2023. (Year: 2023).*
(Continued)

*Primary Examiner* — Alan S Miller
(74) *Attorney, Agent, or Firm* — Novo TechIP International PLLC

(57) ABSTRACT

A data processing system implements obtaining an image of a user interface of an application and a textual representation of a structure of the user interface from a client-side proxy on a client device; analyzing the image of the user interface using a vision language model to obtain one or more task recommendations; analyzing the textual representation of the structure of the user interface and the one or more task recommendations using a completion language model to generate one or more workflows, each workflow being associated with a task recommendation of the one or more task recommendations and comprising one or more actions
(Continued)

and executable code to perform the one or more actions in the application; providing the one or more workflows to the client-side proxy; causing the client-side proxy to present a representation of each task recommendation of the one or more task recommendations on the user interface.

20 Claims, 20 Drawing Sheets

(51) Int. Cl.
    *G06F 40/40*        (2020.01)
    *G06Q 10/0633*    (2023.01)
    *G06V 10/40*      (2022.01)

(58) Field of Classification Search
    USPC ................................................. 705/7.11–7.42
    See application file for complete search history.

(56)               References Cited

U.S. PATENT DOCUMENTS

| | | | | |
|---|---|---|---|---|
| 7,933,914 | B2 * | 4/2011 | Ramsey | G06F 16/951 |
| | | | | 715/224 |
| 10,963,274 | B2 * | 3/2021 | Shamseddin | G06F 3/0482 |
| 11,481,231 | B2 * | 10/2022 | Wei | G06F 3/04817 |
| 11,526,818 | B2 * | 12/2022 | Faulkner | G06F 16/90332 |
| 11,741,306 | B2 * | 8/2023 | Galley | G06N 3/08 |
| | | | | 704/9 |
| 11,928,426 | B1 * | 3/2024 | Gutzeit | G06F 40/20 |
| 11,995,113 | B2 * | 5/2024 | Smutko | G06F 11/3438 |
| 12,112,526 | B2 * | 10/2024 | Jelveh | G06N 3/084 |
| 12,169,802 | B1 * | 12/2024 | Eldan | G06F 40/186 |
| 12,182,149 | B1 * | 12/2024 | Krishna | G06F 16/248 |
| 2006/0036991 | A1 * | 2/2006 | Biazetti | G06F 9/453 |
| | | | | 717/104 |
| 2011/0106892 | A1 * | 5/2011 | Nelson | G06Q 10/109 |
| | | | | 709/206 |
| 2011/0145822 | A1 * | 6/2011 | Rowe | G06Q 10/10 |
| | | | | 718/100 |
| 2011/0271185 | A1 * | 11/2011 | Chen | G06F 3/0481 |
| | | | | 715/708 |
| 2011/0314404 | A1 * | 12/2011 | Kotler | G06Q 10/109 |
| | | | | 715/772 |
| 2013/0036117 | A1 * | 2/2013 | Fisher | G06F 16/435 |
| | | | | 707/736 |
| 2014/0289621 | A1 * | 9/2014 | Sivakumar | G06F 9/45512 |
| | | | | 715/704 |
| 2016/0203004 | A1 * | 7/2016 | Strong | G06F 3/04842 |
| | | | | 715/708 |
| 2017/0308511 | A1 * | 10/2017 | Beth | G06F 40/169 |
| 2018/0336415 | A1 * | 11/2018 | Anorga | G06F 3/048 |
| 2019/0187987 | A1 * | 6/2019 | Fauchère | G06F 9/3017 |
| 2019/0384621 | A1 * | 12/2019 | Chen | G06F 3/0483 |
| 2020/0073684 | A1 * | 3/2020 | Shamseddin | G06F 3/04895 |
| 2020/0097586 | A1 * | 3/2020 | Balik | G06F 40/103 |
| 2020/0410392 | A1 * | 12/2020 | Verma | G06N 7/01 |
| 2021/0081227 | A1 * | 3/2021 | Verma | G06N 5/01 |
| 2021/0192140 | A1 * | 6/2021 | Galley | G06N 3/044 |
| 2021/0256433 | A1 * | 8/2021 | Sofer | G06F 16/285 |
| 2022/0076188 | A1 * | 3/2022 | Faulkner | G06Q 10/063114 |
| 2022/0229832 | A1 * | 7/2022 | Li | G06F 16/24578 |
| 2022/0237404 | A1 | 7/2022 | Singh | |
| 2023/0107233 | A1 | 4/2023 | Ripa | |
| 2023/0136309 | A1 * | 5/2023 | Xiao-Devins | H04L 51/56 |
| | | | | 705/7.13 |
| 2023/0281023 | A1 * | 9/2023 | Bienfait | G06F 8/65 |
| | | | | 715/704 |
| 2023/0306726 | A1 * | 9/2023 | Jelveh | G06N 20/00 |
| 2023/0316104 | A1 * | 10/2023 | Ott | G06N 3/048 |
| | | | | 706/46 |
| 2023/0419161 | A1 * | 12/2023 | Dines | G06F 40/174 |
| 2024/0127144 | A1 * | 4/2024 | St. Pierre | G06Q 10/063112 |
| 2024/0386216 | A1 * | 11/2024 | Sodhi | G06F 40/40 |
| 2025/0005027 | A1 * | 1/2025 | Merchant | G06F 16/248 |
| 2025/0013910 | A1 * | 1/2025 | Grigore | G06Q 10/06 |
| 2025/0045304 | A1 * | 2/2025 | Quatro | G06N 20/00 |
| 2025/0045327 | A1 * | 2/2025 | Avram | G06F 9/453 |
| 2025/0182740 | A1 * | 6/2025 | Vishnoi | G06N 20/00 |

OTHER PUBLICATIONS

Extended European search report received for European Application No. 25152517.6, mailed on May 22, 2025, 11 pages.

* cited by examiner

```
[
    {
        "task_title": "Download the paper in PDF",
        "task_description": "Access the paper by downloading it in different formats: - Download PDF"
    },
    {
        "task_title": "Scroll to the next section",
        "task_description": "Move down the page to read the next section of content."
    },
    {
        "task_title": "Navigate to a linked section",
        "task_description": "Click on a navigation link to go to a specific section of the page."
    }
]
```

FIG. 3B

```
{
"task_title": "Download the paper in PDF by scrolling to the next section and navigating to the linked section",
"task_description": "Access the paper by downloading it in different formats: - Download PDF",
"composed": [
    {
    "task_title": "Scroll to the next section",
    "task_description": "Move down the page to read the next section of content.",
    "action_category": "scroll",
    "action_code": "window.scrollBy(0, window.innerHeight);"
    },
    {
    "task_title": "Navigate to a linked section",
    "task_description": "Click on a navigation link to go to a specific section of the page.",
    "action_category": "click",
    "action_code": "document.querySelector('.nav-link-section').click();"
    },
    {
    "task_title": "Download the paper in PDF",
    "task_description": "Access the paper by downloading it in different formats: - Download PDF",
    "action_category": "click",
    "action_code": "document.getElementById('button-id').click();"
    }
    ]
}
```

FIG. 3C

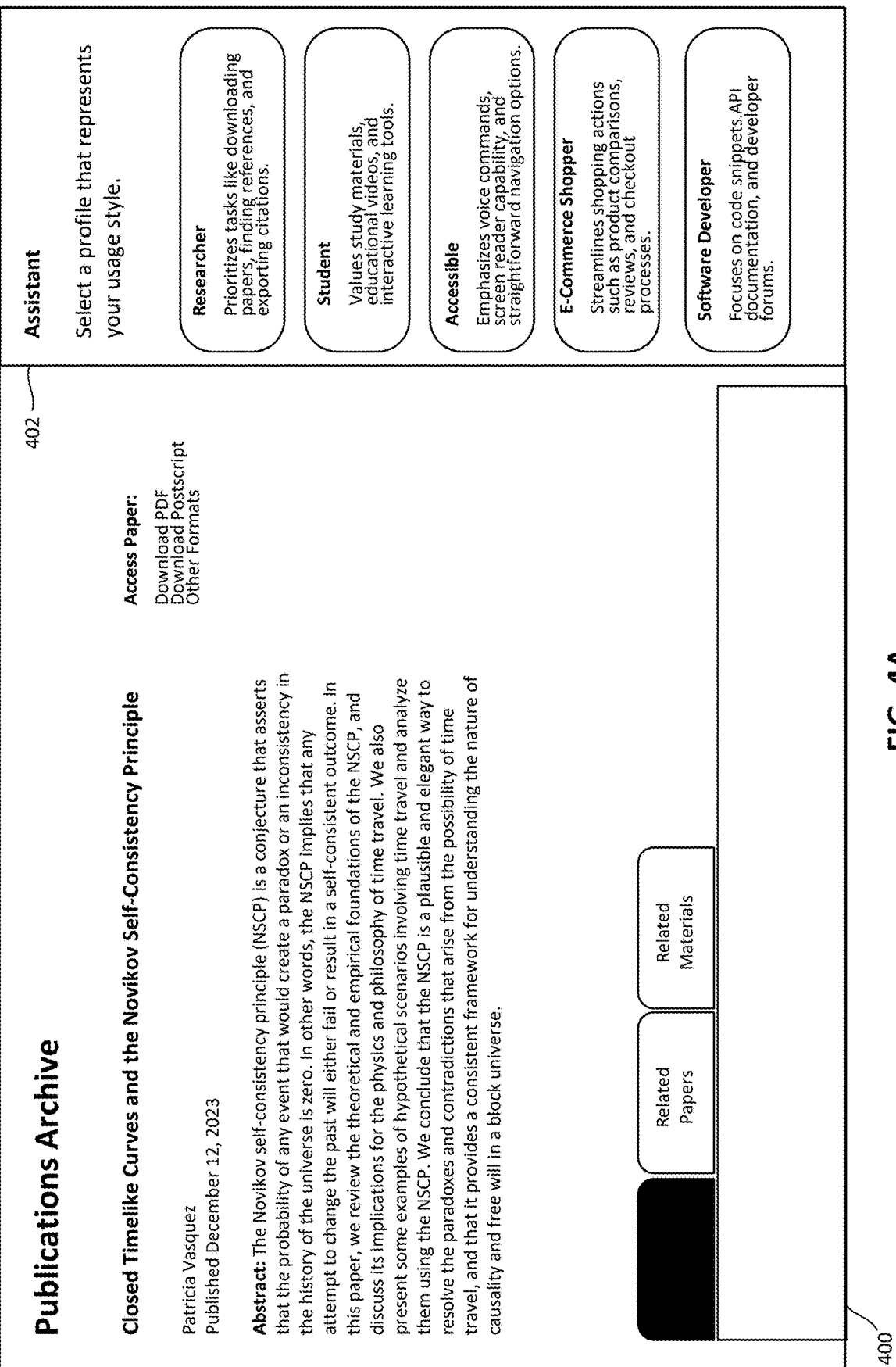

Publications Archive

Closed Timelike Curves and the Novikov Self-Consistency Principle

Patricia Vasquez
Published December 12, 2023

Abstract: The Novikov self-consistency principle (NSCP) is a conjecture that asserts that the probability of any event that would create a paradox or an inconsistency in the history of the universe is zero. In other words, the NSCP implies that any attempt to change the past will either fail or result in a self-consistent outcome. In this paper, we review the theoretical and empirical foundations of the NSCP, and discuss its implications for the physics and philosophy of time travel. We also present some examples of hypothetical scenarios involving time travel and analyze them using the NSCP. We conclude that the NSCP is a plausible and elegant way to resolve the paradoxes and contradictions that arise from the possibility of time travel, and that it provides a consistent framework for understanding the nature of causality and free will in a block universe.

Access Paper:

Download PDF
Download Postscript
Other Formats

Related Papers

Related Materials

402

Assistant

Select a profile that represents your usage style.

Researcher

Prioritizes tasks like downloading papers, finding references, and exporting citations.

Student

Values study materials, educational videos, and interactive learning tools.

Accessible

Emphasizes voice commands, screen reader capability, and straightforward navigation options.

E-Commerce Shopper

Streamlines shopping actions such as product comparisons, reviews, and checkout processes.

Software Developer

Focuses on code snippets,API documentation, and developer forums.

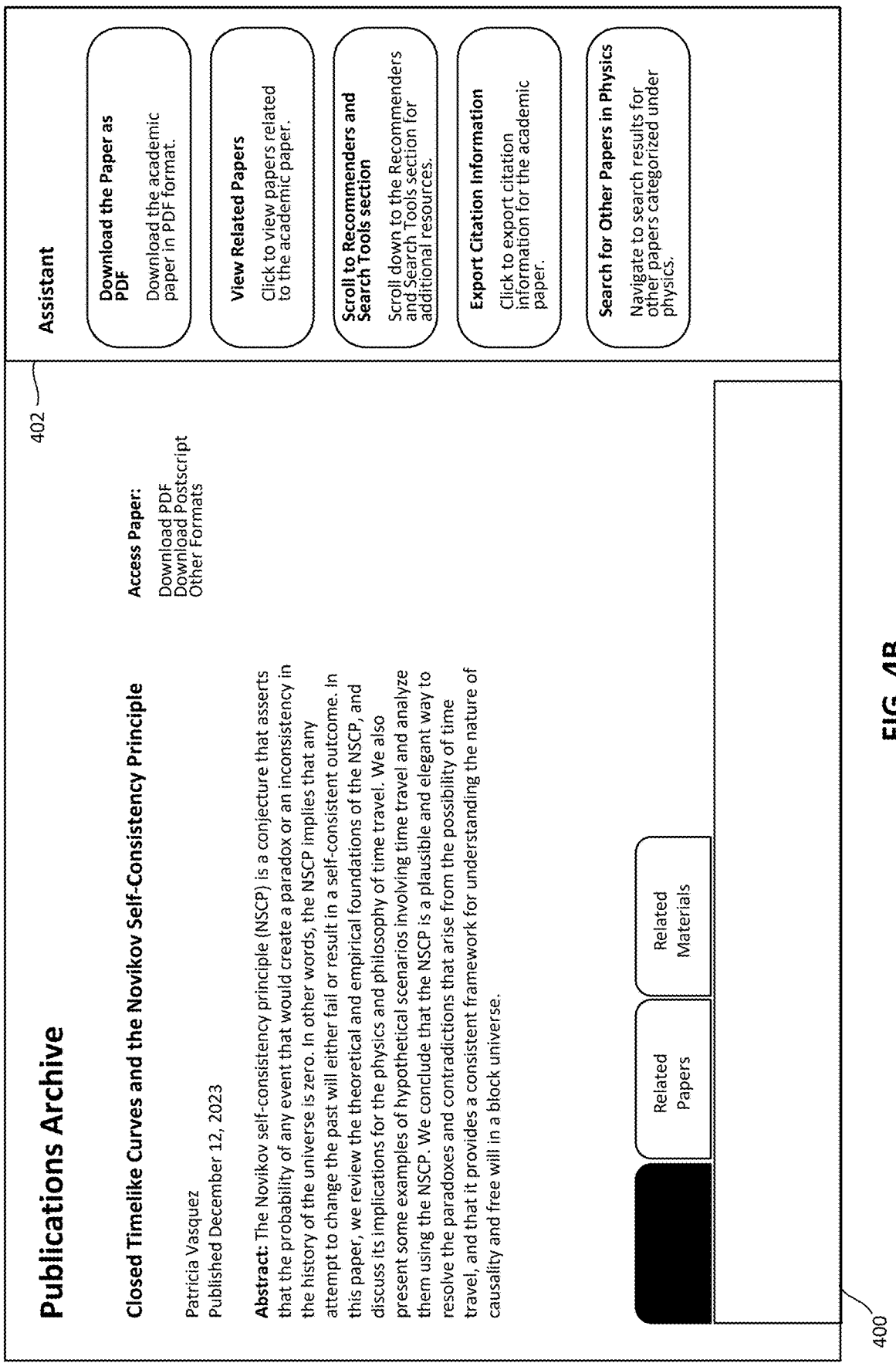

Publications Archive

Closed Timelike Curves and the Novikov Self-Consistency Principle

Patricia Vasquez
Published December 12, 2023

Abstract: The Novikov self-consistency principle (NSCP) is a conjecture that asserts that the probability of any event that would create a paradox or an inconsistency in the history of the universe is zero. In other words, the NSCP implies that any attempt to change the past will either fail or result in a self-consistent outcome. In this paper, we review the theoretical and empirical foundations of the NSCP, and discuss its implications for the physics and philosophy of time travel. We also present some examples of hypothetical scenarios involving time travel and analyze them using the NSCP. We conclude that the NSCP is a plausible and elegant way to resolve the paradoxes and contradictions that arise from the possibility of time travel, and that it provides a consistent framework for understanding the nature of causality and free will in a block universe.

Related Papers

Related Materials

Access Paper:

Download PDF
Download Postscript
Other Formats

Assistant

402

Download the Paper as PDF

Download the academic paper in PDF format.

View Related Papers

Click to view papers related to the academic paper.

Scroll to Recommenders and Search Tools section

Scroll down to the Recommenders and Search Tools section for additional resources.

Export Citation Information

Click to export citation information for the academic paper.

Search for Other Papers in Physics

Navigate to search results for other papers categorized under physics.

Figure 4C:
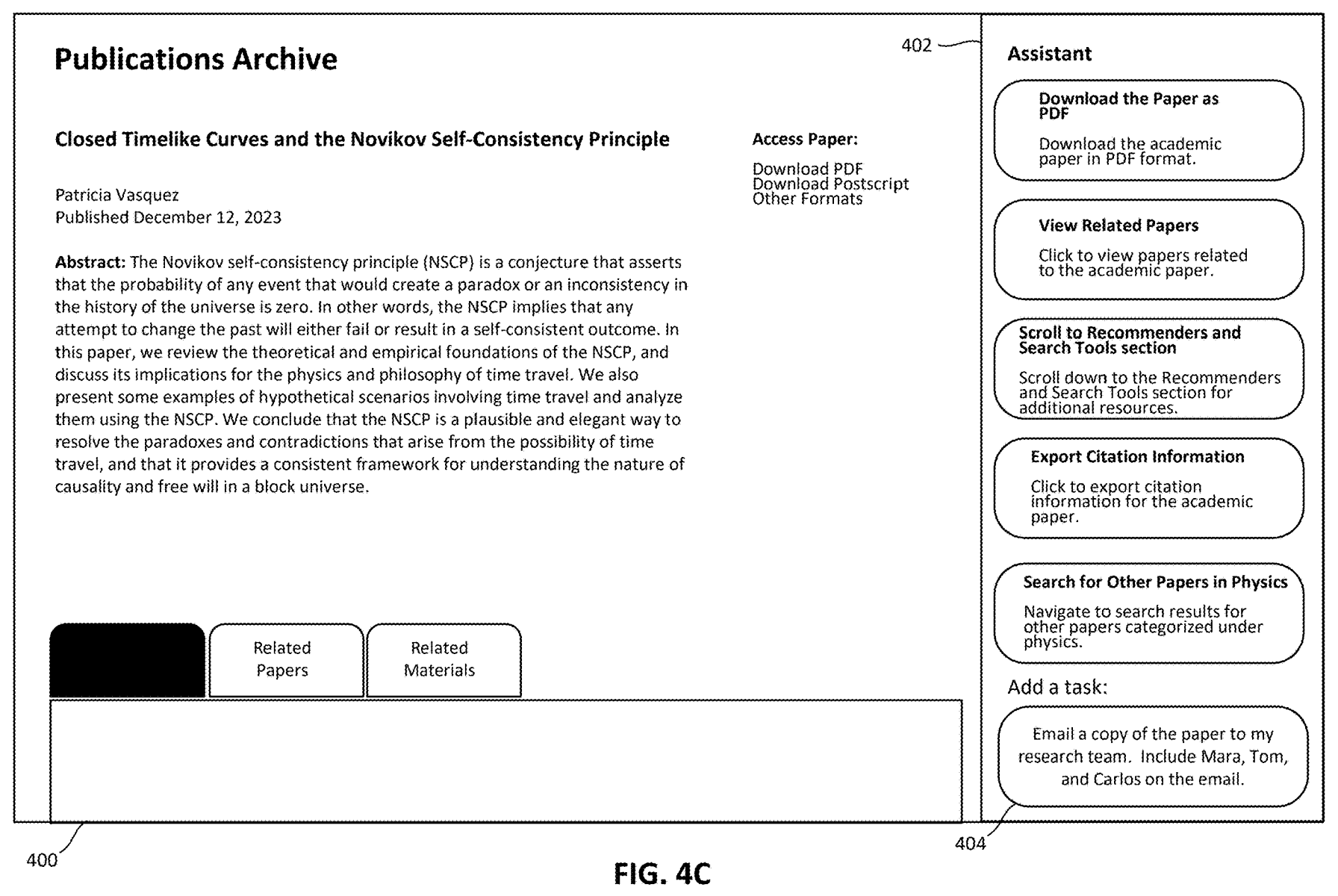

Publications Archive

Closed Timelike Curves and the Novikov Self-Consistency Principle

Patricia Vasquez
Published December 12, 2023

Abstract: The Novikov self-consistency principle (NSCP) is a conjecture that asserts that the probability of any event that would create a paradox or an inconsistency in the history of the universe is zero. In other words, the NSCP implies that any attempt to change the past will either fail or result in a self-consistent outcome. In this paper, we review the theoretical and empirical foundations of the NSCP, and discuss its implications for the physics and philosophy of time travel. We also present some examples of hypothetical scenarios involving time travel and analyze them using the NSCP. We conclude that the NSCP is a plausible and elegant way to resolve the paradoxes and contradictions that arise from the possibility of time travel, and that it provides a consistent framework for understanding the nature of causality and free will in a block universe.

Access Paper:

Download PDF
Download Postscript
Other Formats

Assistant — 402

Download the Paper as PDF

Download the academic paper in PDF format.

View Related Papers

Click to view papers related to the academic paper.

Scroll to Recommenders and Search Tools section

Scroll down to the Recommenders and Search Tools section for additional resources.

Export Citation Information

Click to export citation information for the academic paper.

Search for Other Papers in Physics

Navigate to search results for other papers categorized under physics.

Add a task:

Email a copy of the paper to my research team. Include Mara, Tom, and Carlos on the email.

404

Related Papers

Related Materials

Figure 4D:
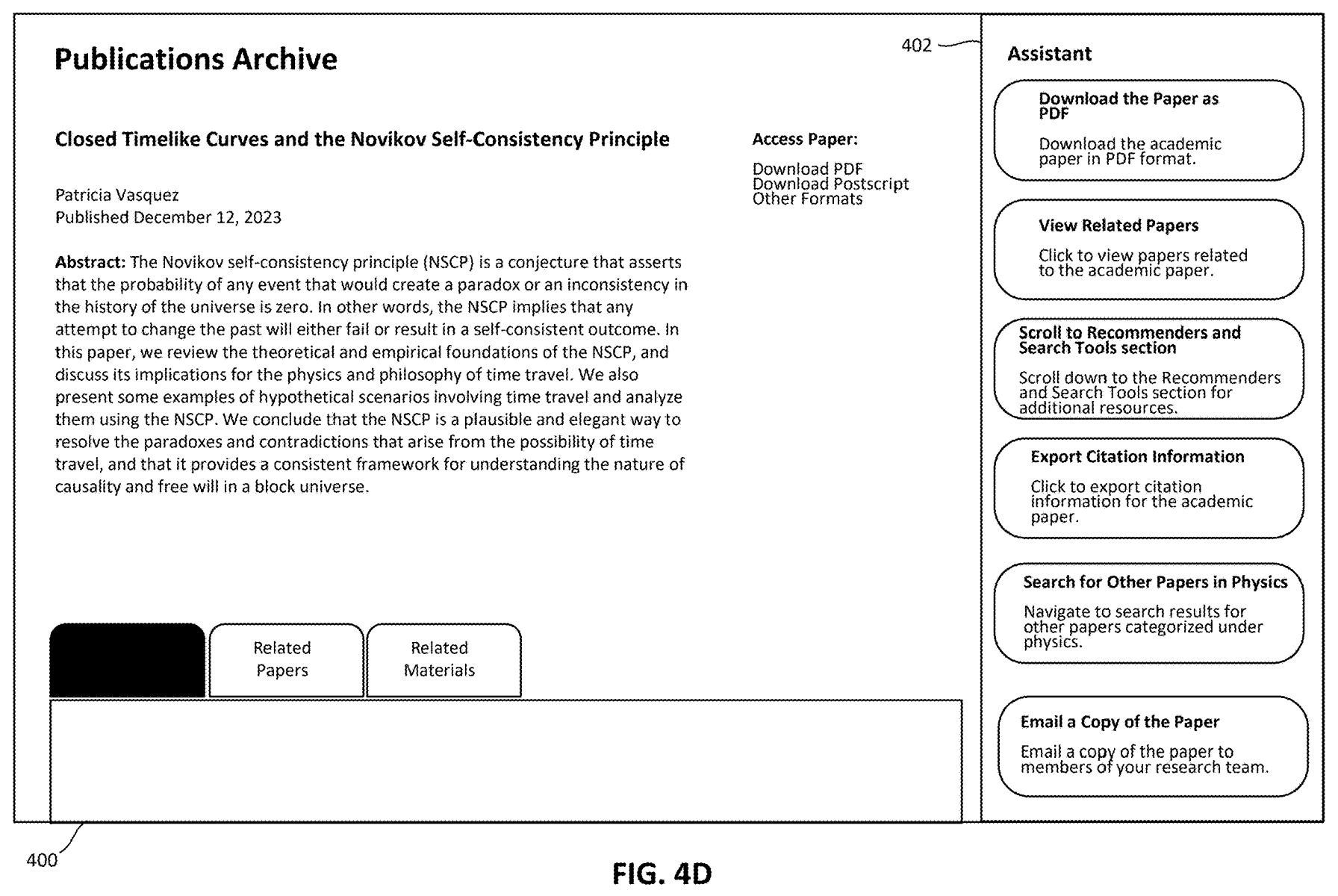

Publications Archive

Closed Timelike Curves and the Novikov Self-Consistency Principle

Patricia Vasquez
Published December 12, 2023

Abstract: The Novikov self-consistency principle (NSCP) is a conjecture that asserts that the probability of any event that would create a paradox or an inconsistency in the history of the universe is zero. In other words, the NSCP implies that any attempt to change the past will either fail or result in a self-consistent outcome. In this paper, we review the theoretical and empirical foundations of the NSCP, and discuss its implications for the physics and philosophy of time travel. We also present some examples of hypothetical scenarios involving time travel and analyze them using the NSCP. We conclude that the NSCP is a plausible and elegant way to resolve the paradoxes and contradictions that arise from the possibility of time travel, and that it provides a consistent framework for understanding the nature of causality and free will in a block universe.

Access Paper:

Download PDF
Download Postscript
Other Formats

Related Papers

Related Materials

Assistant

Download the Paper as PDF

Download the academic paper in PDF format.

View Related Papers

Click to view papers related to the academic paper.

Scroll to Recommenders and Search Tools section

Scroll down to the Recommenders and Search Tools section for additional resources.

Export Citation Information

Click to export citation information for the academic paper.

Search for Other Papers in Physics

Navigate to search results for other papers categorized under physics.

Email a Copy of the Paper

Email a copy of the paper to members of your research team.

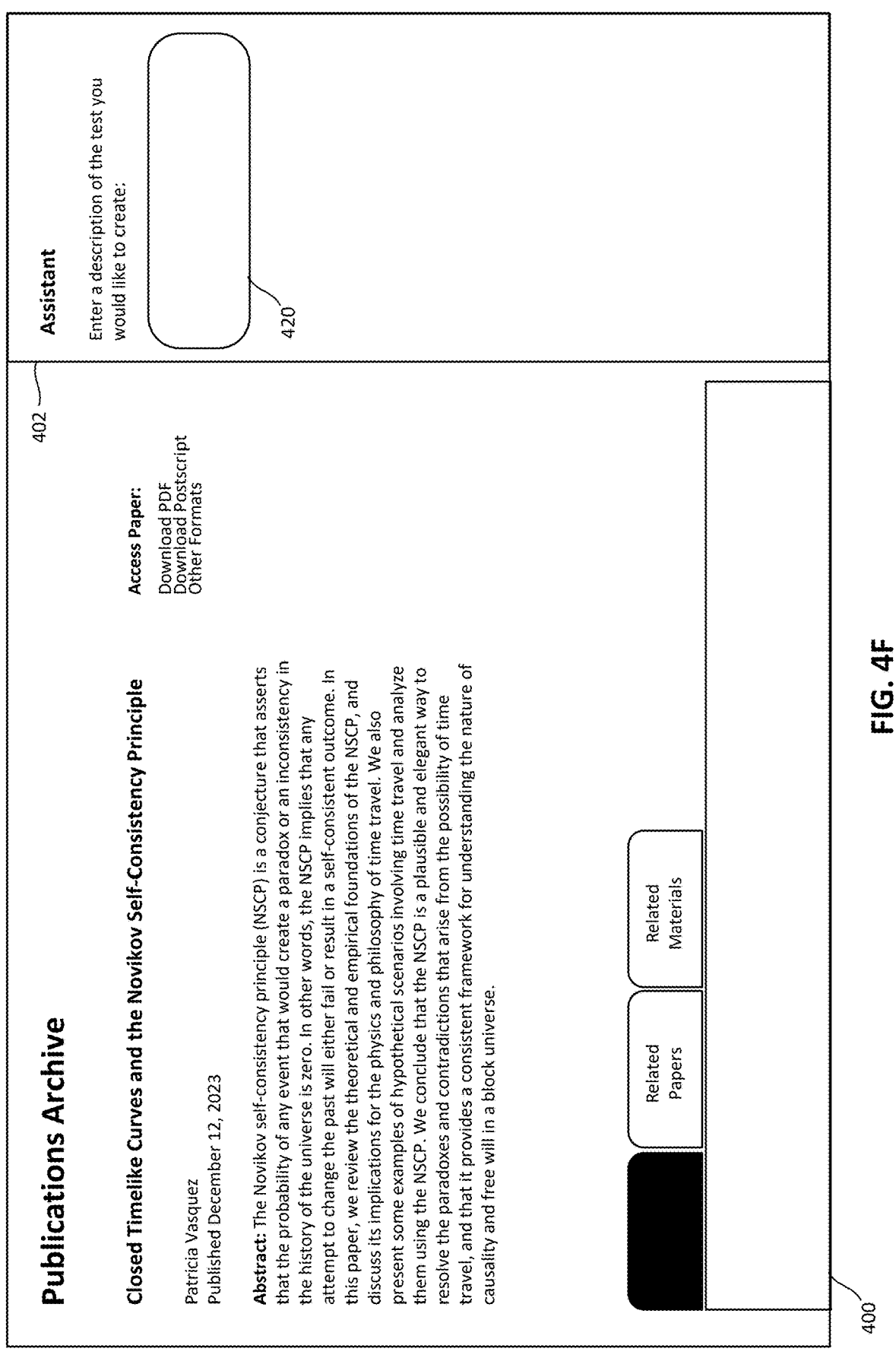

Publications Archive

Closed Timelike Curves and the Novikov Self-Consistency Principle

Patricia Vasquez
Published December 12, 2023

Abstract: The Novikov self-consistency principle (NSCP) is a conjecture that asserts that the probability of any event that would create a paradox or an inconsistency in the history of the universe is zero. In other words, the NSCP implies that any attempt to change the past will either fail or result in a self-consistent outcome. In this paper, we review the theoretical and empirical foundations of the NSCP, and discuss its implications for the physics and philosophy of time travel. We also present some examples of hypothetical scenarios involving time travel and analyze them using the NSCP. We conclude that the NSCP is a plausible and elegant way to resolve the paradoxes and contradictions that arise from the possibility of time travel, and that it provides a consistent framework for understanding the nature of causality and free will in a block universe.

Access Paper:

Download PDF
Download Postscript
Other Formats

Assistant

Enter a description of the test you
would like to create:

420

402

Related
Papers

Related
Materials

500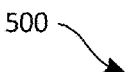

| |
|---|
| Obtain an image of a user interface of an application and a textual representation of a structure of the user interface from a client-side proxy on a client device |

502

| |
|---|
| Analyze the image of the user interface using a vision language model to obtain one or more task recommendations associated with the user interface |

504

| |
|---|
| Analyze the textual representation of the structure of the user interface and the one or more task recommendations associated with the user interface using a completion language model to generate one or more workflows, each workflow of the one or more workflows being associated with a task recommendation of the one or more task recommendations and comprising one or more actions and executable code to perform the one or more actions in the application |

506

| |
|---|
| Provide the one or more workflows to the client-side proxy |

508

| |
|---|
| Cause the client-side proxy to present a representation of each task recommendation of the one or more task recommendations on the user interface of the application |

510

| |
|---|
| Receive an indication that the representation of a task recommendation of the one or more task representations has been actuated on the user interface |

512

| |
|---|
| Execute the executable code associated with the task recommendation on the application |

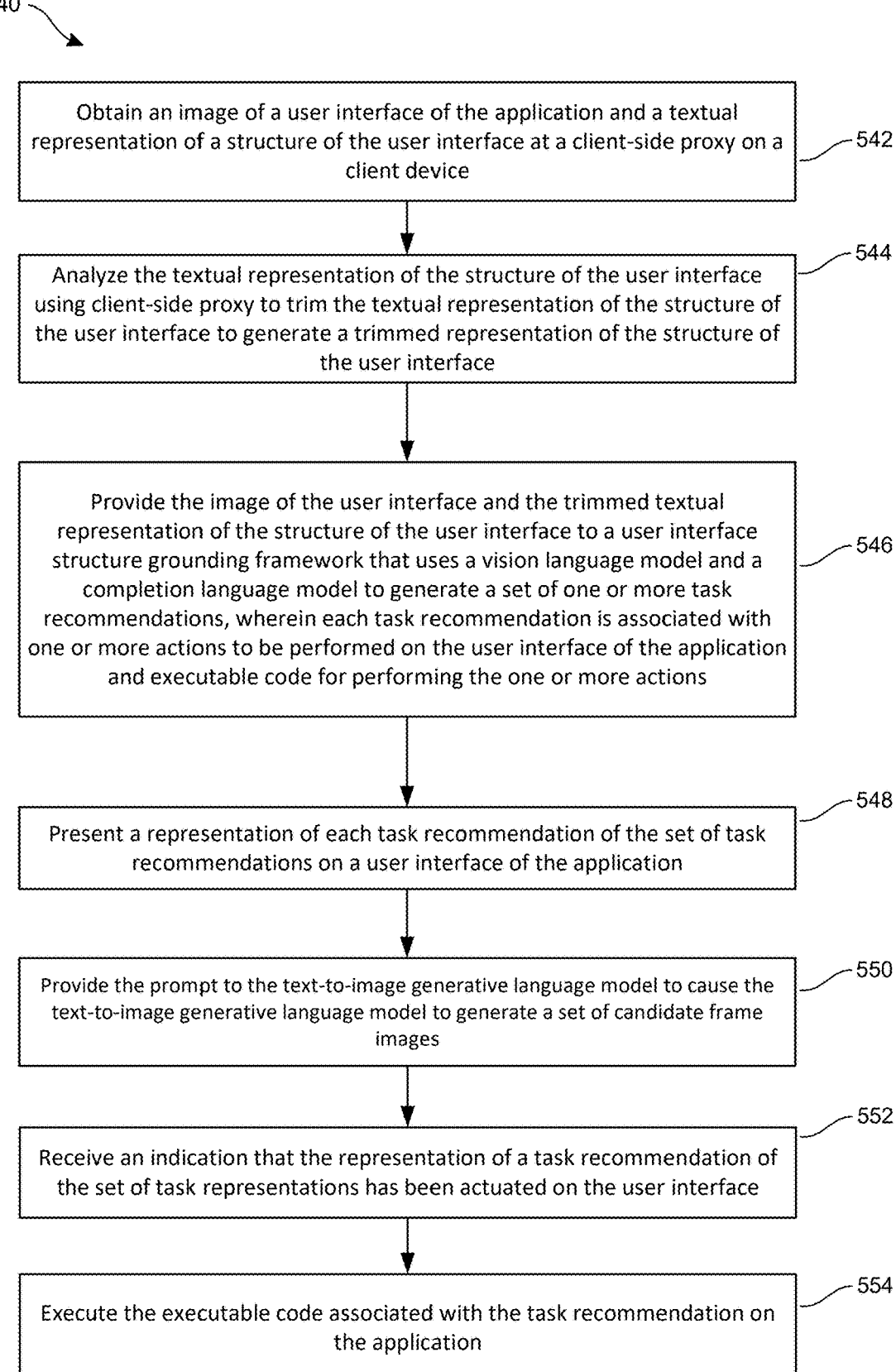

540

Obtain an image of a user interface of the application and a textual representation of a structure of the user interface at a client-side proxy on a client device ⌐542

Analyze the textual representation of the structure of the user interface using client-side proxy to trim the textual representation of the structure of the user interface to generate a trimmed representation of the structure of the user interface ⌐544

Provide the image of the user interface and the trimmed textual representation of the structure of the user interface to a user interface structure grounding framework that uses a vision language model and a completion language model to generate a set of one or more task recommendations, wherein each task recommendation is associated with one or more actions to be performed on the user interface of the application and executable code for performing the one or more actions ⌐546

Present a representation of each task recommendation of the set of task recommendations on a user interface of the application ⌐548

Provide the prompt to the text-to-image generative language model to cause the text-to-image generative language model to generate a set of candidate frame images ⌐550

Receive an indication that the representation of a task recommendation of the set of task representations has been actuated on the user interface ⌐552

Execute the executable code associated with the task recommendation on the application ⌐554

FIG. 5B

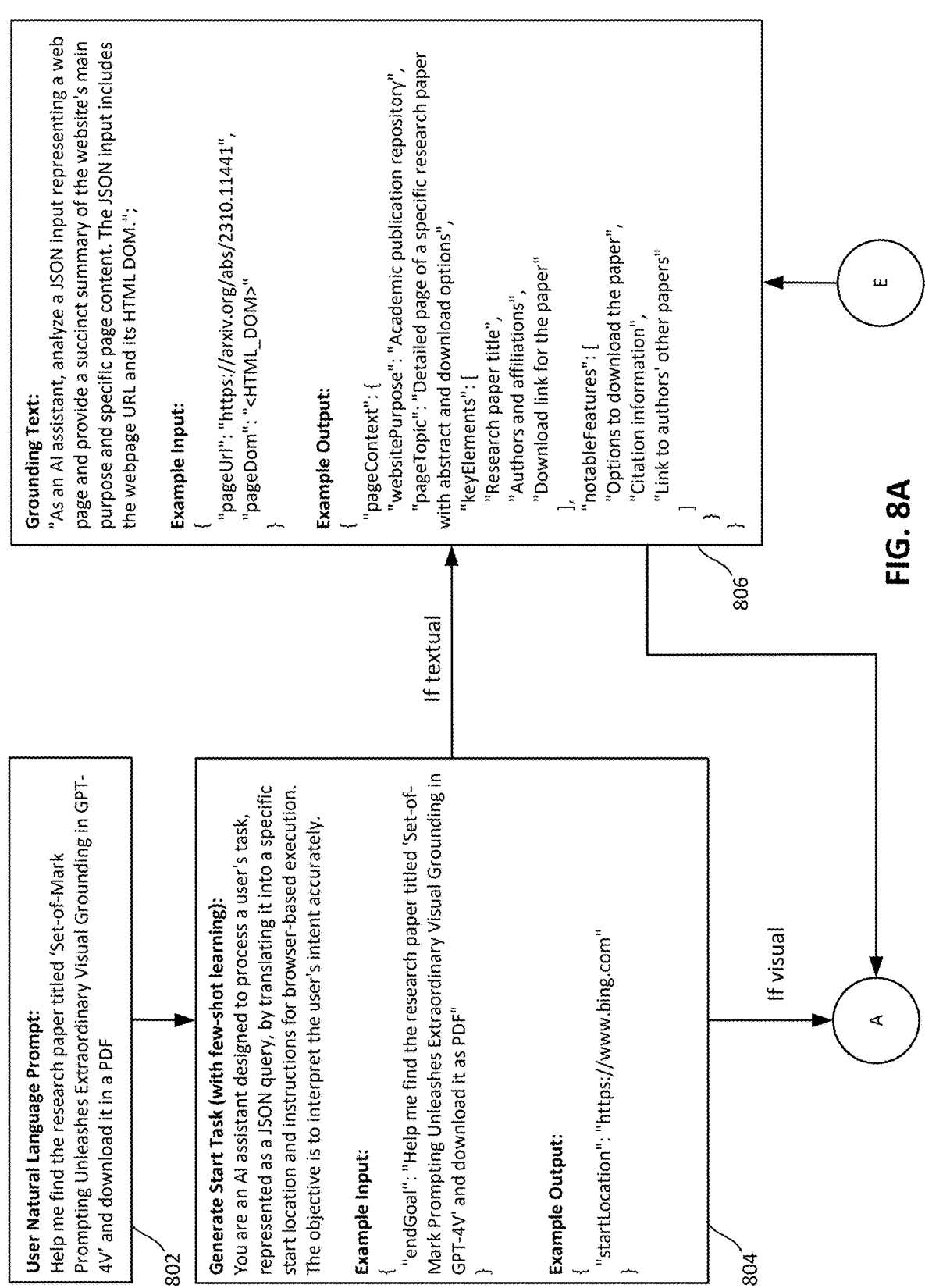

User Natural Language Prompt:
Help me find the research paper titled 'Set-of-Mark Prompting Unleashes Extraordinary Visual Grounding in GPT-4V' and download it in a PDF

802

Generate Start Task (with few-shot learning):
You are an AI assistant designed to process a user's task, by translating it into a specific start location and instructions for browser-based execution, represented as a JSON query. The objective is to interpret the user's intent accurately.

Example Input:
{
  "endGoal": "Help me find the research paper titled 'Set-of-Mark Prompting Unleashes Extraordinary Visual Grounding in GPT-4V' and download it as PDF"
}

Example Output:
{
  "startLocation": "https://www.bing.com"
}

804

If visual

A

If textual

Grounding Text:
"As an AI assistant, analyze a JSON input representing a web page and provide a succinct summary of the website's main purpose and specific page content. The JSON input includes the webpage URL and its HTML DOM.";

Example Input:
{
  "pageUrl": "https://arxiv.org/abs/2310.11441",
  "pageDom": "<HTML_DOM>"
}

Example Output:
{
  "pageContext": {
    "websitePurpose": "Academic publication repository",
    "pageTopic": "Detailed page of a specific research paper with abstract and download options",
    "keyElements": [
      "Research paper title",
      "Authors and affiliations",
      "Download link for the paper"
    ],
    "notableFeatures": [
      "Options to download the paper",
      "Citation information",
      "Link to authors' other papers"
    ]
  }
}

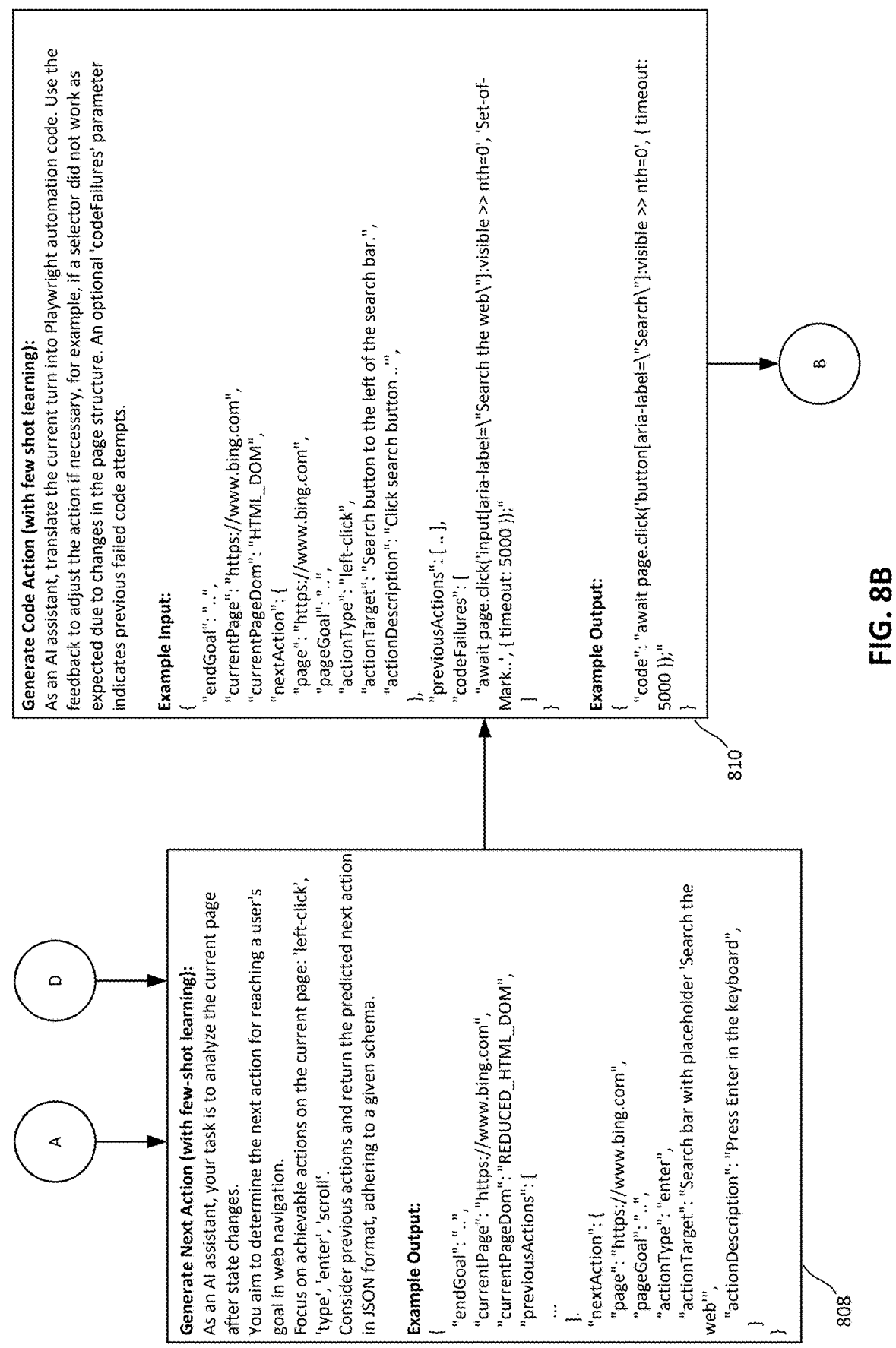

Generate Code Action (with few shot learning):

As an AI assistant, translate the current turn into Playwright automation code. Use the feedback to adjust the action if necessary, for example, if a selector did not work as expected due to changes in the page structure. An optional 'codeFailures' parameter indicates previous failed code attempts.

Example Input:

```
{
    "endGoal": "...",
    "currentPage": "https://www.bing.com",
    "currentPageDom": "HTML_DOM",
    "nextAction": {
        "page": "https://www.bing.com",
        "pageGoal": "...",
        "actionType": "left-click",
        "actionTarget": "Search button to the left of the search bar.",
        "actionDescription": "Click search button ...",
    },
    "previousActions": [...],
    "codeFailures": [
        "await page.click('input[aria-label=\"Search the web\"]:visible >> nth=0', 'Set-of-Mark..', { timeout: 5000 });"
    ]
}
```

Example Output:

```
{
    "code": "await page.click('button[aria-label=\"Search\"]:visible >> nth=0', { timeout: 5000 });"
}
```

810

Generate Next Action (with few-shot learning):

As an AI assistant, your task is to analyze the current page after state changes.

You aim to determine the next action for reaching a user's goal in web navigation.

Focus on achievable actions on the current page: "left-click', 'type', 'enter', 'scroll'.

Consider previous actions and return the predicted next action in JSON format, adhering to a given schema.

Example Output:

```
{
    "endGoal": "...",
    "currentPage": "https://www.bing.com",
    "currentPageDom": "REDUCED_HTML_DOM",
    "previousActions": {
        ...
    },
    "nextAction": {
        "page": "https://www.bing.com",
        "pageGoal": "...",
        "actionType": "enter",
        "actionTarget": "Search bar with placeholder 'Search the web'",
        "actionDescription": "Press Enter in the keyboard",
    }
}
```

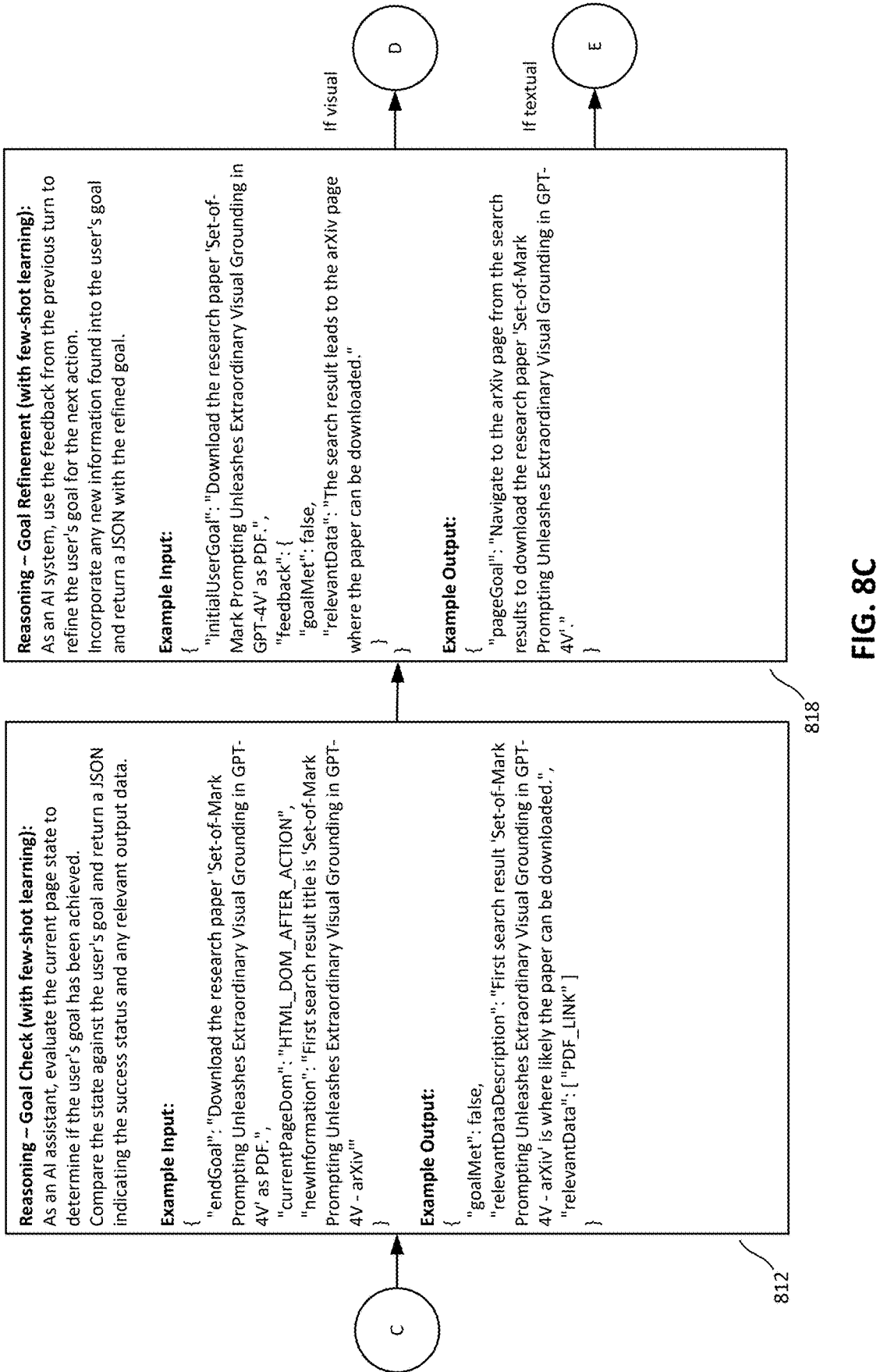

Reasoning – Goal Check (with few-shot learning):
As an AI assistant, evaluate the current page state to determine if the user's goal has been achieved.
Compare the state against the user's goal and return a JSON indicating the success status and any relevant output data.

Example Input:
{
"endGoal": "Download the research paper 'Set-of-Mark Prompting Unleashes Extraordinary Visual Grounding in GPT-4V' as PDF.",
"currentPageDom": "HTML_DOM_AFTER_ACTION",
"newInformation": "First search result title is 'Set-of-Mark Prompting Unleashes Extraordinary Visual Grounding in GPT-4V - arXiv'"
}

Example Output:
{
"goalMet": false,
"relevantDataDescription": "First search result 'Set-of-Mark Prompting Unleashes Extraordinary Visual Grounding in GPT-4V - arXiv' is where likely the paper can be downloaded.",
"relevantData": [ "PDF_LINK" ]
}

812

Reasoning – Goal Refinement (with few-shot learning):
As an AI system, use the feedback from the previous turn to refine the user's goal for the next action.
Incorporate any new information found into the user's goal and return a JSON with the refined goal.

Example Input:
{
"initialUserGoal": "Download the research paper 'Set-of-Mark Prompting Unleashes Extraordinary Visual Grounding in GPT-4V' as PDF.",
"feedback": {
"goalMet": false,
"relevantData": "The search result leads to the arXiv page where the paper can be downloaded."
}
}

Example Output:
{
"pageGoal": "Navigate to the arXiv page from the search results to download the research paper 'Set-of-Mark Prompting Unleashes Extraordinary Visual Grounding in GPT-4V'."
}

818

If visual — D

If textual — E

FIG. 8C

Figure 8D:
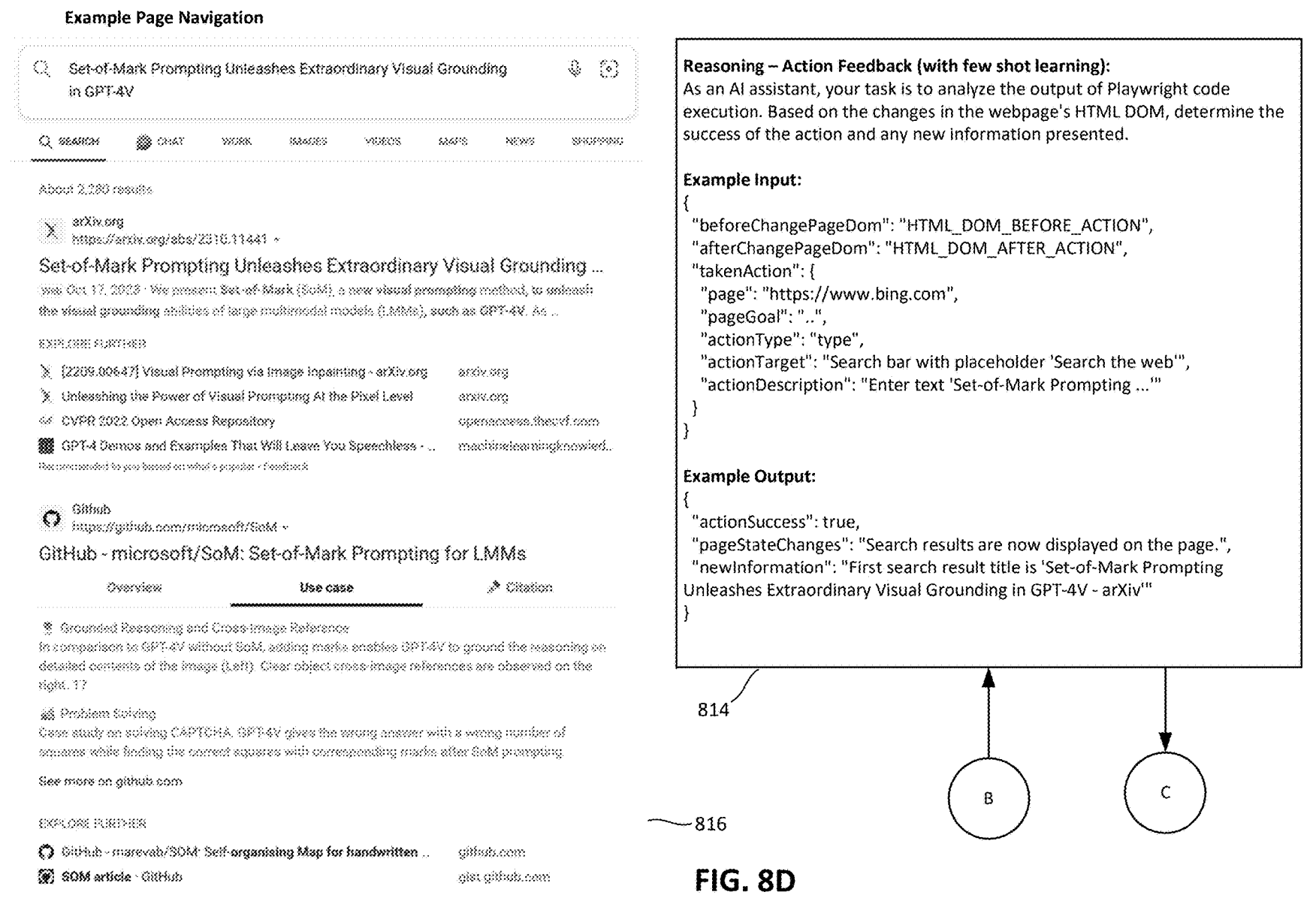

Example Page Navigation

Reasoning – Action Feedback (with few shot learning):
As an AI assistant, your task is to analyze the output of Playwright code execution. Based on the changes in the webpage's HTML DOM, determine the success of the action and any new information presented.

Example Input:
{
"beforeChangePageDom": "HTML_DOM_BEFORE_ACTION",
"afterChangePageDom": "HTML_DOM_AFTER_ACTION",
"takenAction": {
"page": "https://www.bing.com",
"pageGoal": "...",
"actionType": "type",
"actionTarget": "Search bar with placeholder 'Search the web'",
"actionDescription": "Enter text 'Set-of-Mark Prompting ...'"
}
}

Example Output:
{
"actionSuccess": true,
"pageStateChanges": "Search results are now displayed on the page.",
"newInformation": "First search result title is 'Set-of-Mark Prompting Unleashes Extraordinary Visual Grounding in GPT-4V - arXiv'"
}

ARTIFICIAL INTELLIGENCE DRIVEN USER INTERFACE STRUCTURE GROUNDING FOR AUTOMATED GENERATION OF ACTIONABLE TASKS

BACKGROUND

Modern web, mobile, and desktop users navigate web pages and application user interfaces that are often intricate and dynamic, demanding precise context awareness of the user and app-specific interactions. Current automation, productivity, testing, and accessibility frameworks struggle to build a semantic model that can understand relevant user tasks in natural language and be used at an inference phase to generate the corresponding code actions using common user interface (UI) test frameworks or browser application program interface (API) code. Current approaches rely on scraping the underlying source of the application pages, such as the Document Object Model (DOM) for web pages or web applications and markup language or source code for applications. However, attempting to analyze such content using current artificial intelligence (AI) models often leads to inaccurate results and hallucinations due to the models lacking an understanding of application layouts. Consequently, current automation, productivity, testing, and accessibility frameworks need to be developed and tailored for each application to be supported. Developers of such automation, accessibility, and/or productivity tools must then train the models used by the tools on specific data sets to adapt to the needs of the users of these tools. Developers of accessibility tools for users having various disabilities face similar challenges. The vast majority of web-based content as well as mobile and/or desktop applications fails to meet fundamental accessibility standards. For example, users with attention-deficit/hyperactivity disorder (ADHD) or dyslexia may benefit from assistive companions that provide clear visual clues and consistent navigation patterns. Furthermore, developers of automation test suits face similar challenges when developing systems for translating natural language queries into code actions that can be executed by the automated testing tools. The AI models in each of these applications lack grounding of the structure of user interface of the application, web page, or web application. Hence, there is a need for improved systems and methods that provide means for AI driven user interface structure grounding to facilitate automated generation of actionable tasks.

SUMMARY

An example data processing system according to the disclosure includes a processor and a memory storing executable instructions. The instructions when executed cause the processor alone or in combination with other processors to perform operations including obtaining an image of a user interface of the application and a textual representation of a structure of the user interface from a client-side proxy on a client device; analyzing the image of the user interface using a vision language model to obtain one or more task recommendations associated with the user interface; analyzing the textual representation of the structure of the user interface and the one or more task recommendations associated with the user interface using a completion language model to generate one or more workflows, each workflow of the one or more workflows being associated with a task recommendation of the one or more task recommendations and comprising one or more actions and executable code to perform the one or more actions in the application; providing the one or more workflows to the client-side proxy; causing the client-side proxy to present a representation of each task recommendation of the one or more task recommendations on the user interface of the application; receiving an indication that the representation of a task recommendation of the one or more task representations has been actuated on the user interface; and executing the executable code associated with the task recommendation on the application.

An example method implemented in a data processing system includes obtaining an image of a user interface of the application and a textual representation of a structure of the user interface from a client-side proxy on a client device; analyzing the image of the user interface using a vision language model to obtain one or more task recommendations associated with the user interface; analyzing the textual representation of the structure of the user interface and the one or more task recommendations associated with the user interface using a completion language model to generate one or more workflows, each workflow of the one or more workflows being associated with a task recommendation of the one or more task recommendations and comprising one or more actions and executable code to perform the one or more actions in the application; providing the one or more workflows to the client-side proxy; causing the client-side proxy to present a representation of each task recommendation of the one or more task recommendations on the user interface of the application; receiving an indication that the representation of a task recommendation of the one or more task representations has been actuated on the user interface; and executing the executable code associated with the task recommendation on the application.

An example data processing system according to the disclosure includes a processor and a memory storing executable instructions. The instructions when executed cause the processor alone or in combination with other processors to perform operations including obtaining an image of a user interface of the application and a textual representation of a structure of the user interface at a client-side proxy on a client device; analyzing the textual representation of the structure of the user interface using client-side proxy to trim the textual representation of the structure of the user interface to generate a trimmed representation of the structure of the user interface; providing the image of the user interface and the trimmed textual representation of the structure of the user interface to a user interface structure grounding framework that uses a vision language model and a completion language model to generate a set of one or more task recommendations, wherein each task recommendation is associated with one or more actions to be performed on the user interface of the application and executable code for performing the one or more actions; presenting a representation of each task recommendation of the set of task recommendations on a user interface of the application; receiving an indication that the representation of a task recommendation of the one or more task representations has been actuated on the user interface; and executing the executable code associated with the task recommendation on the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3B is a diagram showing an example intermediate output of the task identification unit 302.

FIG. 3C is a diagram showing an example output of the workflow development unit 304.

FIGS. 4A-4F are diagrams showing an example user interface of an application that implements an AI driven assistant according to the techniques disclosed herein.

FIG. 5A is a flow chart of an example process for providing artificial intelligence driven analysis of a user interface of an application according to the techniques disclosed herein.

FIG. 5B is a flow chart of another example process for providing artificial intelligence driven analysis of a user interface of an application according to the techniques disclosed herein.

FIGS. 8A-8D are example flow diagrams showing how a natural language prompt input by a user is processed according to the techniques disclosed herein.

DETAILED DESCRIPTION

Figure 1A:
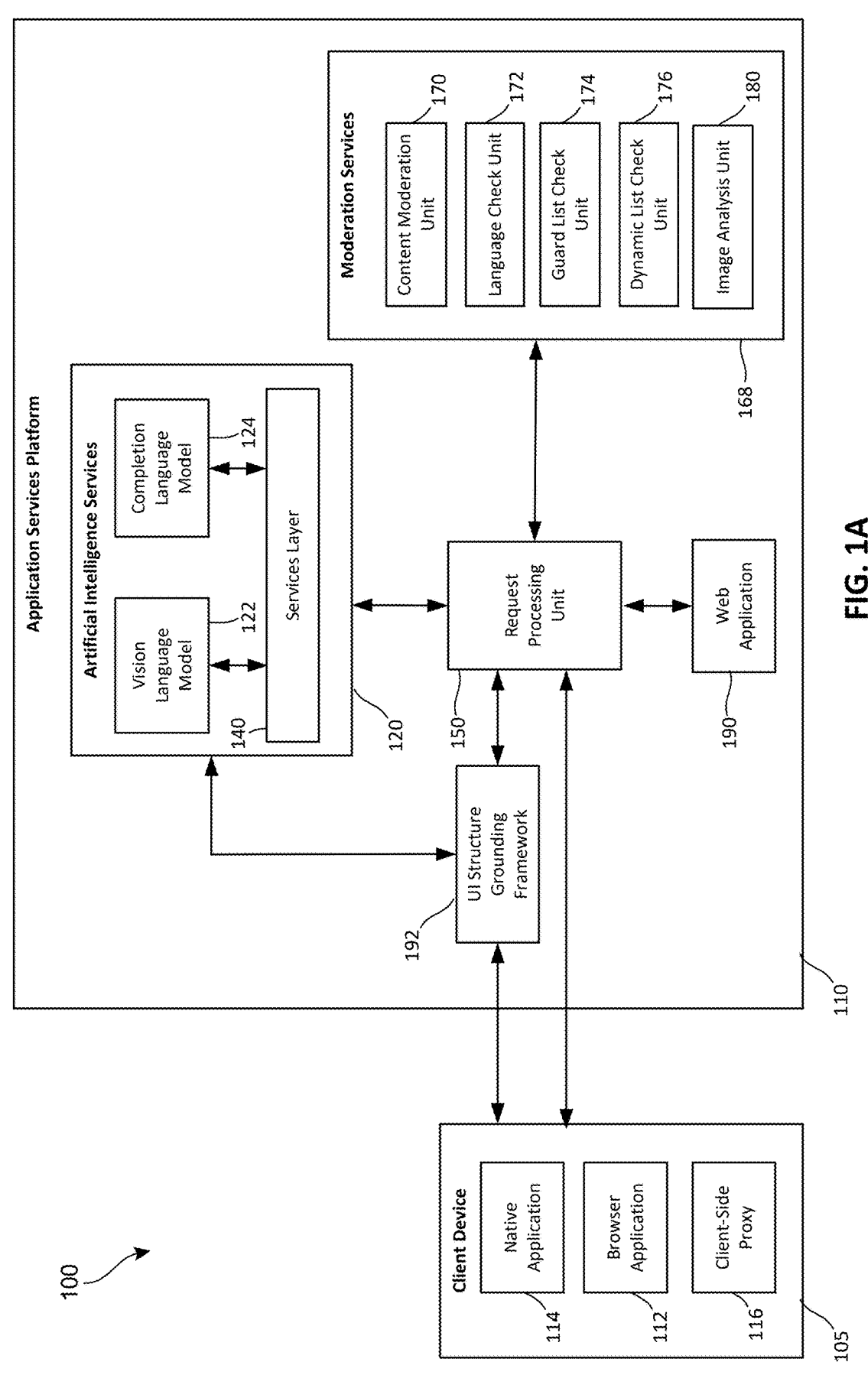
FIG. 1A is a diagram of an example computing environment in which the techniques described herein are implemented.

Systems and methods for AI driven user interface structure grounding to facilitate automated generation of actionable tasks on the user interface are provided herein. These techniques can be utilized on web pages, web applications, and/or applications to implement AI-based automation, productivity, testing, and accessibility assistants. These techniques provide a technical solution to implementing such AI-based assistants by providing grounding regarding the structure of the user interface to the models. Current automation, productivity, testing, and accessibility assistants lack the grounding in the structure of the user interface of the web pages, web applications, and/or applications, which results in these assistants generating inaccurate results and/or hallucinations due to their lack of understanding of the structure of the user interface.

The techniques herein provide a technical solution to this problem by implementing a framework that analyzes the user interface of a target application to identify actionable tasks and implements a user interface that presents these actionable tasks to the user. The framework obtains a structure of the user interface represented in a markup language, such as but not limited to Hypertext Markup Language (HTML), Extensible Application Markup Language (XAML), or Extensible Markup Language (XML). The framework also obtains one or more images and/or videos of the user interface of the web page, web application, or application, and constructs a prompt to a vision language model to analyze the one or more image and/or video to extract a set of tasks identified in the user interface. A technical benefit of this approach is that using the vision model to analyze the user interface provides a much more accurate identification of tasks associated with the user interface compared with current approaches which analyze a textual representation of the user interface to predict a set of tasks that may be performed with the user interface. The markup language or other textual representation of the structure of the user interface typically includes a large number of tags that represent various elements of the user interface that are not relevant for determining actions that may be performed using the user interface. Consequently, analyzing the structural information using a language model to identify the tasks often results in the language model generating inaccurate results and/or hallucinations because the language model lacks an understanding of which tags of the structural layout of the user interface are relevant.

In addition to extracting a set of tasks identified in the user interface, the framework analyzes the textual representation of the structure of the user interface and trims non-relevant tags from the markup language. The non-relevant tags include tags that are not useful for grounding the models analyzing the structure of the user interface. The framework then analyzes the trimmed structural representation of the user interface and the list of tasks identified by the vision model to generate a workflow for performing each task in the task list. The framework constructs a prompt for a completion language model to translate the list of task recommendations, which are described in natural language, to a workflow that comprises executable code. A completion language model is capable of generating text or other output based on a prompt provided to the model. The completion model utilizes the natural language descriptions of the language model to select the appropriate executable code for completing each task recommendation. The executable code is code that can be injected into the target application to perform the actions to complete a specific task. The format of the executable code depends on the type of target application. In instances in which the target application is desktop or mobile native application, the framework creates executable code for an automated testing tool, such as but not limited to Appium®, that can be used to execute functionality of the native application. In instances in which the target application is a browser application presenting a web page or web application, the executable code is implemented for a browser API or other tools that enables the browser to perform actions on the content of the web page or web application being presented on the browser application. The browser-based application testing tools can include but are not limited to Microsoft Playwright®, Selenium Web-Driver®, Cypress®, Puppeteer®, Plainly®. In some instances, a workflow is generated for a single task recommendation. However, in other instances, workflows are generated for multiple task recommendations. The executable code is provided to a client-side proxy that operates on the client device of the user, and the client-side proxy injects the code into the target application for execution. The task recommendations and their associated workflows are presented on a user interface of the client device of the user. The user interface may be that of the target application or a separate user interface. The user may click on or otherwise activate a task recommendation and the client-side proxy injects the associated executable code into the target application to cause the target application to perform the selected task recommendation. A technical benefit of this approach is that the framework can generate the set of task recommendations without requiring the functionality to be integrated into the target application as the target application is being developed. Another technical benefit of these techniques is that the executable code is validated prior to providing the executable code to the client-side proxy, which enables the framework to identify scenarios in which there are errors in the executable code that is generated. This approach enables the framework to attempt to automatically correct errors in the executable code resulting from incorrect inferences or hallucinations of the completion model.

Implementations of the techniques herein can also be used to create a context-aware testing framework that helps perform user interface actions in response to a descriptive prompt. A technical benefit of this approach is that the user can describe a test to be performed in natural language, and the framework generates the executable code to perform the test without requiring that the user generate any executable code or have knowledge of how to navigate through the user interface of the application under test. These and other technical benefits of the techniques disclosed herein will be evident from the discussion of the example implementations that follow.

FIG. 1A is a diagram of an example computing environment 100 in which the techniques described herein are implemented. The example computing environment 100 includes a client device 105 and an application services platform 110. The application services platform 110 provides one or more cloud-based applications and/or provides services to support one or more web-enabled native applications on the client device 105. These applications may include but are not limited to design applications, communications platforms, visualization tools, and collaboration tools for collaboratively creating visual representations of information, and other applications for consuming and/or creating electronic content. The client device 105 and the application services platform 110 communicate with each other over a network (not shown) or through Inter-Process Communication (IPC). The network may be a combination of one or more public and/or private networks and may be implemented at least in part by the Internet.

The application services platform 110 includes a request processing unit 150, artificial intelligence (AI) services 120, moderation services 168, a web application 190, and a document structure grounding framework 192. The request processing unit 150 is configured to receive requests from an application implemented by the native application 114 of the client device 105, the browser application 112, and/or the web application 190 of the application services platform 110. The requests may include but are not limited to requests to generate new content, modify existing content, and/or perform other actions as discussed in the examples which follow. In some implementations, the web application 190 of the application services platform 110 implements this functionality of the design application. In other implementations, at least a portion of this functionality is implemented by the native application 114 of the client device 105. The request processing unit 150 also coordinates communication and exchange of data among components of the application services platform 110 as discussed in the examples which follow.

The UI structure grounding framework 192 analyzes images and/or video and user interface structure information of the user interface of a target application to identify various task recommendations for actions that can be automatically performed on the target application for the user. The task recommendations are identified by analyzing the images and/or video of the user interface of the target application with the vision language model 122 of the AI services 120 to generates task recommendations that describe how to perform each task in natural language. The task recommendation are then analyzed along with the user interface structure information using the completion language model 124 of the AI services 120 to generate executable code that can be injected into the target application to perform the actions associated with a particular task recommendation. The type of program code depends on the type of target application. The target application can be implemented by the native application 114 of the client device in some implementations, and the UI structure grounding framework 192 creates executable code for an automated testing tool, such as but not limited to Appium®, that can be used to execute functionality of a native application. In instances in which the target application is a browser application 112 presenting a web page or web application, the executable code is implemented for a browser API or other tools that enables the browser application 112 to perform actions on the content of the web page or web application being presented on the browser application 112. the browser-based application testing tools can include but are not limited to Microsoft Playwright®, Selenium WebDriver®, Cypress®, Puppeteer®, Plainly®. Additional details of the UI structure grounding framework 192 are described in the examples which follow.

The AI services 120 provide various machine learning models that analyze and/or generate content. The AI services 120 include a vision language model 122 and completion language model 124 in the example implementation shown in FIG. 1. Other implementations may include additional models and/or a different combination of models to provide services to the various components of the application services platform 110.

The vision language model 122 is a multimodal model that is configured to receive images and natural language prompts as an input. The vision language model 122 analyzes the image content and performs various actions based on the content that are specified in the natural language prompt. The UI infrastructure grounding framework 192 utilizes the vision language model 122 to analyze images and/or frames of video of the user interface of the target application to generate a set of tasks associated with the user interface. The vision language model 122 is implemented by a large language model (LLM) in some implementations. The LLM is a Generative Pre-trained Transformer 4 with Vision model (GPT-4V) in some implementations. Other vision models can also be used in other implementations. Additional details of how the UI infrastructure grounding framework 192 utilizes the vision language model 122 are discussed in the examples which follow.

The completion language model 124 is an LLM that is trained to generate text based on a natural language prompt.

The UI structure grounding framework 192 utilizes the completion language model 124 to generate executable code that performs the tasks identified by the visional language model. The executable code can be injected into and executed by the target application. In some implementations, the completion language model 124 is GPT-3.5-turbo-instruct model, which is designed to interpret and execute instructions. Additional details of how the UI infrastructure grounding framework 192 utilizes the completion language model 124 are discussed in the examples which follow.

The services layer 140 receives requests to present a prompt to the models of the AI services 120 from the request processing unit 150 and/or the UI structure grounding framework 192. The prompts include natural language prompts entered by a user of the native application 114 or the web application 190. The prompts also include prompts generated by components of the UI structure grounding framework 192. Additional details of the prompt construction are described in detail in the examples which follow. The services layer 140 formats the natural language prompts in a format that is recognized by each of the models in some implementations. The services layer 140 also routes any content generated by the models to the source of the request, which includes the UI structure grounding framework 192 or request processing unit 150.

The moderation services 168 analyze natural language prompts input by the user and/or generated by the target application implemented by the native, which can be implemented by the application 114 and/or the web application 190. The moderation services 168 also analyze content generated by the vision language model 122, completion language model 124, and/or other models of the AI services 120 to ensure that potentially objectionable or offensive content is not generated or utilized by the application services platform 110. The moderation services 168 also analyze the images and/or video of the target application to ensure that the user has not provided an image and/or video that includes potentially objectionable or offensive content. If potentially objectionable or offensive content is detected, the moderation services 168 provides a blocked content notification to the client device 105 indicating that the natural language prompt, the user-specified image, and/or the content generated by the AI services 120 in response to the natural language prompt included content that is blocked.

The moderation services 168 performs several types of checks on the natural language prompts entered by the user in the target application or the web application 190 and/or content generated by the vision language model 122, the completion language model 124, and/or other models of the AI services 120. The content moderation unit 170 is implemented by a machine learning model trained to analyze the textual content of these various inputs to perform a semantic analysis on the textual content to predict whether the content includes potentially objectionable or offensive content. The language check unit 172 performs another check on the textual content using a second model configured to analyze the words and/or phrase used in textual content to identify potentially offensive language. The guard list check unit 174 is configured to compare the language used in the textual content with a list of prohibited terms including known offensive words and/or phrases. The dynamic list check unit 176 provides a dynamic list that can be quickly updated by administrators to add additional prohibited words and/or phrases. The dynamic list may be updated to address problems such as words or phrases becoming offensive that were not previously deemed to be offensive. The words and/or phrases added to the dynamic list may be periodically migrated to the guard list as the guard list is updated. The image analysis unit 180 analyzes the image and/or frames of video of the target application to ensure that the images or frames of video do not include potentially objectionable or offensive content. The image analysis unit 180 identifies text included in the images and/or frames of video for processing by the content moderation unit 170, the language check unit 172, the guard list check unit 174, and the dynamic list check unit 176 to determine whether the textual content includes any potentially objectionable or offensive content. The image analysis unit 180 also performs object recognition to predict whether the images and/or frames of the video include any potentially objectionable or offensive content. In some implementations, the image analysis unit 180 utilizes the vision language model 122 to analyze the user-specified images, the image frames, and/or the framed images. The specific checks performed by the moderation services 168 may vary from implementation to implementation. If one or more of these checks determines that the textual content includes offensive content, the moderation services 168 can notify the application services platform 110 that some action should be taken.

In some implementations, the moderation services 168 generates a blocked content notification, which is provided to the client device 105. The native application 114 or the web application 190 receives the notification and presents a message on a user interface of the design application or other application that submitted the natural language prompt which could not be processed. The user interface provides information indicating why the blocked content notification was issued in some implementations. The user may attempt to refine the natural language prompt to remove the potentially offensive content. A technical benefit of this approach is that the moderation services 168 provides safeguards against both user-created and model-created content to ensure that prohibited offensive or potentially offensive content is not presented to the user in the native application 114 or the web application 190.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device 105, other implementations may include a different number of client devices that utilize services provided by the application services platform 110.

The client device 105 includes a native application 114 and a browser application 112. The native application 114 is a web-enabled native application, in some implementations, implements a design application as discussed above. The browser application 112 can be used for accessing and viewing web-based content provided by the application services platform 110. In such implementations, the application services platform 110 implements one or more web applications, such as the web application 190, that enables users to create content, including creating image frames for user-specified images. The application services platform 110 supports both the native application 114 and a web application 190 in some implementations, and the users may choose which approach best suits their needs.

The client device 105 also includes a client-side proxy 116. The client-side proxy 116 serves as an intermediary between the native application 114 and the UI structure grounding framework 192 and/or the browser application 112 and the UI structure grounding framework 192. In some implementations, the functionality of the client-side proxy 116 is implemented, at least in part, by the native application 114 and/or the browser application 112.

Figure 1B:
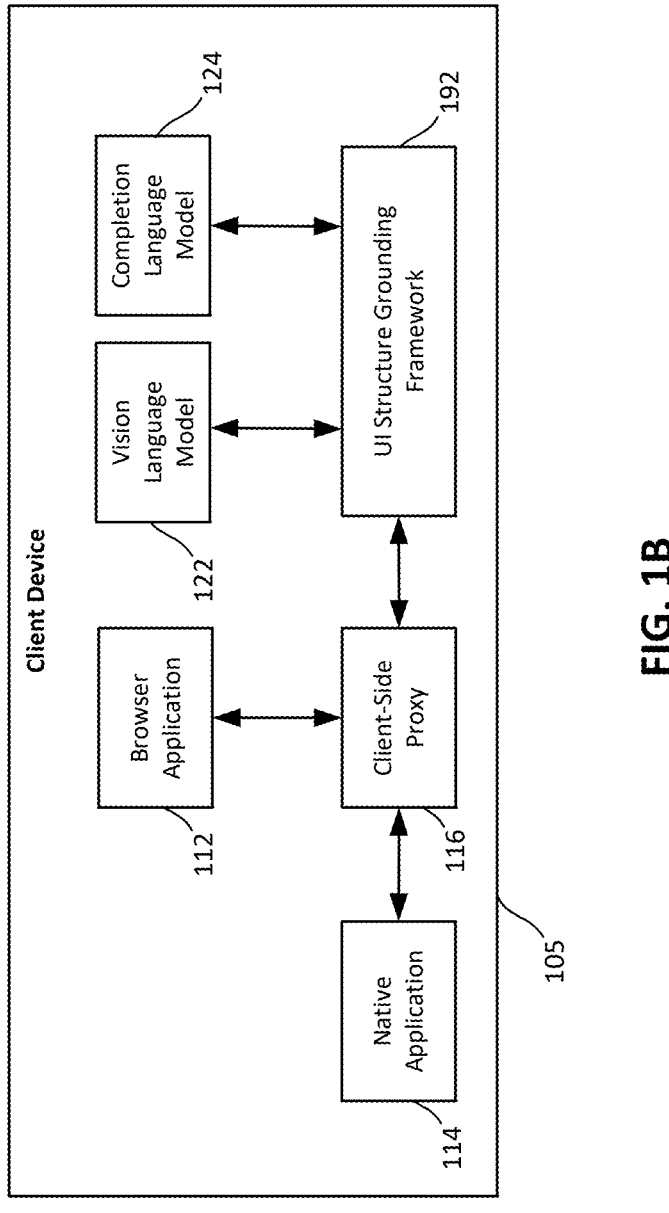
FIG. 1B is a diagram of an example computing environment in which the techniques described herein are implemented.

FIG. 1B is an alternative embodiment in which the client device 105 in which UI structure grounding framework 192, the vision language model 122, and the completion language model 124 are implemented on the client device 105. In such implementations, the client device 105 implements local copies of the language models. These models may be compressed versions of the language models implemented on the application services platform 110 shown in FIG. 1A. The models may need to be compressed in order to be able to be utilized on the client device 105 because the client device has limited computing, storage, and memory compared to the cloud-based services that implement the application service platform 110.

Figure 2:
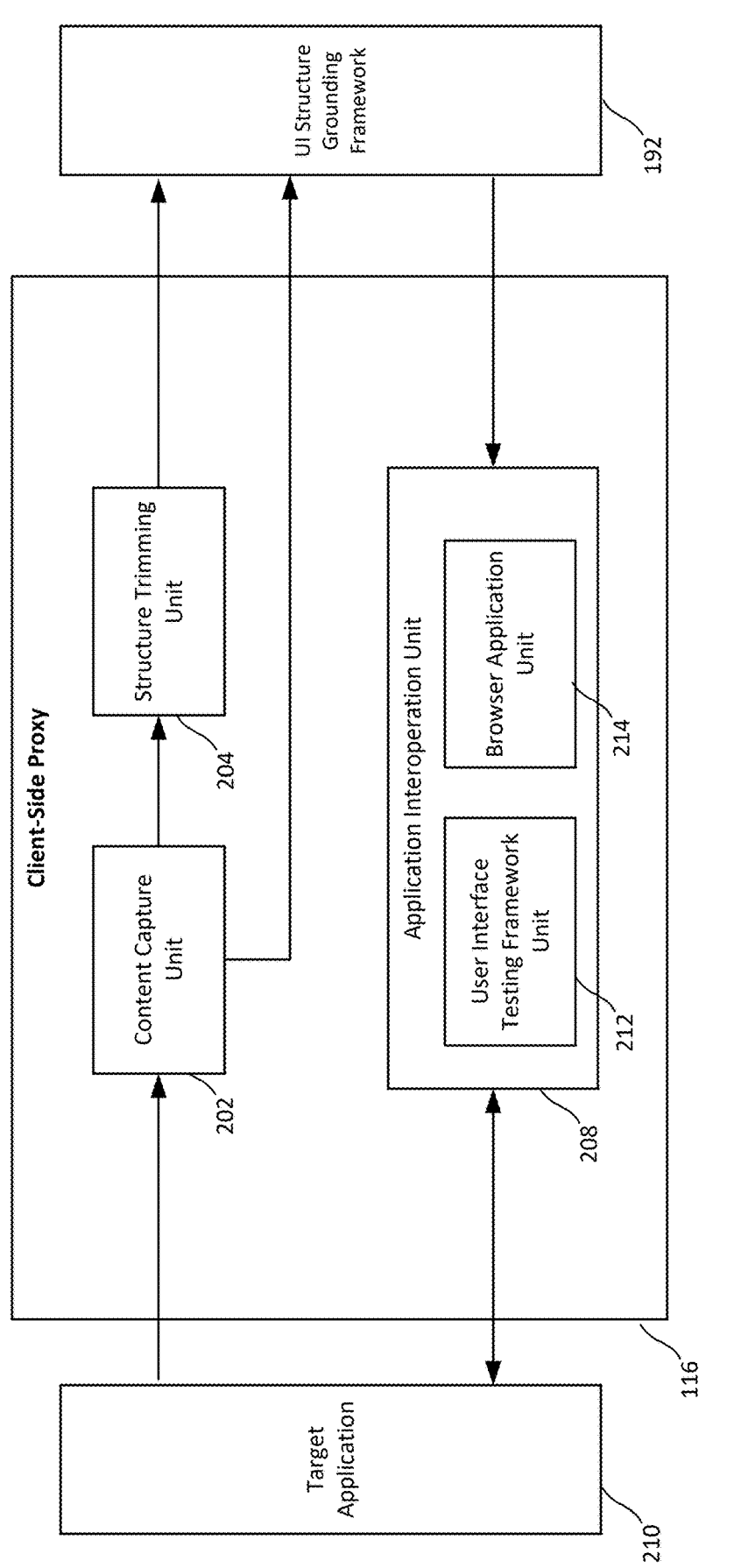
FIG. 2 is a diagram showing an example implementation of the client-side proxy shown in FIGS. 1A and 1B.

FIG. 2 is a diagram showing an example implementation of the client-side proxy 116 shown in FIGS. 1A and 1B. The client-side proxy 116 includes a content capture unit 202, a structure trimming unit 204, and an application interoperation unit 208. The content capture unit 202 obtains one or more images and/or one or more frames of a video of a user interface of a target application 210 that has been captured on the client device 105. As discussed in the preceding examples, the target application may be a native application on the client device 105, such as the native application 114. The target application may also be a browser application on the client device 105, such as the browser application 112, which is being used to display a web page or web application 190. The client-side proxy 116 also obtains a textual representation of the structure of the user interface of the target application. This textual representation is implemented in HTML, XML, XAML, or another markup language utilized by the target application. For example, a web page or web application presented on the browser application 112 is implemented in HTML, and the structure of the web page or browser application 112 is implemented as a Document Object Model providing a hierarchical representation of the contents of the web page or web application as a tree structure. The UI structure grounding framework 192 utilizes the representation of the structure of the user interface to understand the type of tasks recommendations that may be presented. The content capture unit 202 provides the images and/or frames of video to the UI structure grounding framework 192, and the textual representation of the structure of the user interface to the structure trimming unit 204. The content capture unit 202 provides the natural language prompt input by the user of the target application if one was input or the natural language prompt generated by the target application if one was generated.

The structure trimming unit 204 trims the structural representation of the user interface of the target application to remove non-relevant tags or elements from the structural representation. The non-relevant tags or elements are tags that are not useful for grounding the models analyzing the structure of the user interface. The structure trimming unit 204 keeps the tags or elements related to controls, hyperlinks, and/or other elements of the user interface that are associated with actions that may be performed by the user. The structure trimming unit 204 outputs a trimmed representation of the structure of the user interface to the UI structure grounding framework 192.

Figure 3A:
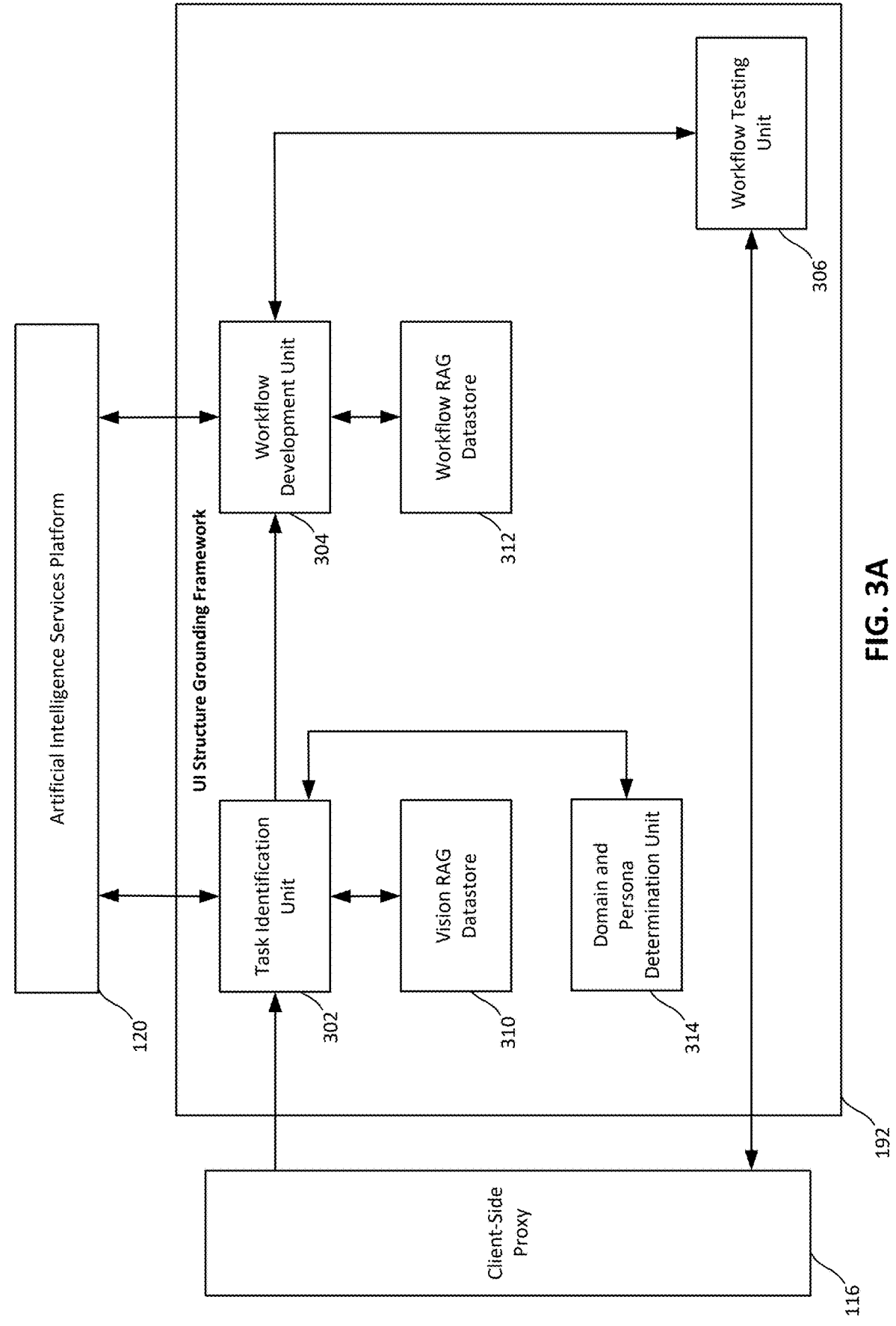
FIG. 3A is a diagram showing an example implementation of the UI structure grounding framework shown in FIGS. 1 and 2.

The application interoperation unit 208 receives task recommendations and the associated executable code for performing these actions from the UI structure grounding framework 192. FIG. 3A shows a detailed example of how the UI structure grounding framework 192 generates the task recommendations and the associated executable code. The application incorporation unit includes a user interface testing framework unit 212 and a browser application unit 214. The user interface testing framework unit 212 is configured to handle the execution of program code on the target application 210. In instances in which the target application 210 is a native application on the client device 105, such as the native application 114, the UI structure grounding framework 192 generates executable code for an automated testing tool that executes functionality of the native application. The automated testing tool is Microsoft Playwright® in some implementations, while other implementations utilize other automated testing frameworks. In instances in which the target application 210 is a browser application, such as the browser application 112, presenting a web page or web application, the executable code is implemented for a browser API that enables the browser to perform actions on the content of the web page or web application being presented on the browser application. The client-side proxy 116 presents the task recommendations on a user interface in some implementations. This user interface may be the user interface of the target application or may be a separate user interface. Examples of such a user interface are shown in FIGS. 4A-4F.

FIG. 3A is a diagram showing an example implementation of the UI structure grounding framework 192 shown in FIGS. 1A, 1B, and 2. The UI structure grounding framework 192 includes a task identification unit 302, a workflow development unit 304, a workflow testing unit 306, a vision RAG datastore 310, a workflow RAG datastore 312, and domain and persona determination unit 314.

The task identification unit 302 generates task recommendations based on the user interface of the target application. The task identification unit 302 unit utilizes prompt engineering, embeddings, and Retrieval Augmented Generation (RAG) to construct prompts for the vision language model 122. The task identification unit 302 receives, from the client-side proxy 116, the images and/or frames of video to the UI structure grounding framework 192, the trimmed textual representation of the structure of the user interface of the target application output by the structure trimming unit 204, and the natural language prompt input by the user of the target application or generated by the target application in instance where such a prompt is provided. The task identification unit 302 also receives the trimmed representation of the structure of the user interface of the target application 210 from the client-side proxy 116.

The task identification unit 302 can weigh the task recommendations provided based on the domain of the target application and a persona of the user using the target application. The domain of the target application refers to a specified sphere of activity or knowledge. Target applications may be associated with a domain of a set of predetermined domains, such as but not limited to medical, education, shopping, travel, and/or other predetermined domains. The domain and persona determination unit 314 classifies the target application into one of these predetermined domains. In some implementations, the domain and persona determination unit 314 utilizes a classification model that infers a domain for the application based on the application information provided by the target application 210, the natural language query input by the user or provided by the target application, the trimmed structural information representing the structure of the user interface of the target information, and/or any other information provided by the client-side proxy 116. The domain and persona determination unit 314 provides an indication of the domain to the task identification unit 302.

The domain and persona determination unit 312 also classifies the user of the target application into one of a plurality of predetermined personas. Users may be associated with a persona from among a predetermined set of personas that provides an indication of how the user typically utilizes the target application. These personas may include but are not limited to e-commerce shoppers, students, software developers, researchers, accessibility limited, and/or personas. In some implementations, the domain and persona determination unit 312 utilizes a classification model that infers a persona for the user based on the application information provided by the target application 210, the natural language query input by the user or provided by the target application, the trimmed structural information representing the structure of the user interface of the target information, and/or any other information provided by the client-side proxy 116. The domain and persona determination unit 312 provides an indication of the persona to the task identification unit 302. In some implementations, such as that shown in FIG. 4C, the client-side proxy 116 prompts the user of the target application to select a persona rather than having the domain and persona determination unit 312 infer the persona of the user. In such implementations, the client-side proxy 116 provides an indication of the selected persona to the UI structure grounding framework 192.

The task identification unit 302 utilizes the persona indication and the domain indication to select examples of the types of tasks associated with that domain of target application and user persona from the vision RAG datastore 310. The vision RAG datastore 310 includes curated examples of the types of task recommendations that may be appropriate for specified domains and/or user personas. The task identification unit 302 utilizes these relevant task recommendations when constructing a prompt for the vision language model 122 to provide additional context to the vision language model 122. A technical benefit of this RAG approach is that the additional context provided to the vision language model 122 can help the model to provide more accurate inferences regarding the task recommendations to provide when analyzing the user interface of the target application. Examples of the types of content that may be provided in the vision RAG datastore 310 and how these examples may be utilized by the task identification unit 302 when constructing the prompt are described in the implementations which follow. Another technical benefit of using RAG is that the RAG datastores can serve as additional memory for the vision language model 122 and completion language model 124. during the inference phase. The RAG datastores allow the vision language model 122 and completion language model 124 to process input request per chunk, thereby simulating exceeding the max token size of 4 k or 16 k token limits of the model. A technical benefit of this approach is that the usage of RAG enables the models to process much larger and/or much more complex web pages, in which the relevant candidates of element selectors may be present in different chunks of the HMTL of the page.

The task identification unit 302 constructs the prompt to the vision language model 122 and provides the prompt the AI services 120 to be analyzed by the vision language model 122. The task identification unit 302 receives a set of task recommendations from the vision language model 122 in response to the prompt. The task identification unit 302 selects a predetermined number of task recommendations from the set of tasks recommendations and provides the selected task recommendations to the workflow development unit 304 for analysis. The predetermined number of task recommendations may be a single recommendation or multiple task recommendations. The predetermined number of task recommendations is based at least in part on the target application and how the target application is being utilized by the user, as will be discussed in greater detail in the examples which follow.

The task identification unit 302 ranks the set of task recommendations and selects the most relevant task recommendation or recommendations in some implementations. The task identification unit 302 implements this by comparing the natural language query input by the user or generated by the target application 210. The natural language query and each of the textual recommendations are analyzed using an embedding model that converts a textual input into a vector representation. In some implementations, the task identification unit 302 utilizes the text-ada-002 embeddings model, but other such models can be utilized by the task identification unit 302. FIG. 3B is an example of the intermediate output of the task identification unit 302 in which task recommendations have been identified. The intermediate output is a non-limiting example of the output of the task identification unit 302. The tasks identified and format of the intermediate output may differ in other implementations.

The workflow development unit 304 analyzes the task recommendations that are output by the task identification unit 302 and generates a workflow for executing each of the task recommendations. Each workflow includes one or more actions that are performed to complete a task associated with a respective task recommendation and executable code that implements the one or more actions. To generate these workflows, the workflow development unit 304 matches the tasks recommendations with corresponding representations of these tasks in the structural representation of the user interface provided by client-side proxy 116. The workflow development unit 304 identifies the task related elements of the DOM or other structural representation of the user interface using selectors or XML Path Language (XPath) expressions. These task related elements are provided as an input to the completion language model 124 to obtain the executable code that executes the actions associated with the task related elements.

The workflow development unit 304 utilizes RAG to improve the workflows that are created. The workflow RAG datastore includes curated examples of the types of actions that are typically included in a workflow for specific tasks and examples of the executable code that implements these actions. The workflow development unit 304 selects the examples based on the workflow information and may also consider the domain indication and the persona indications obtained by the task identification unit 302 when selecting examples from the workflow RAG datastore 312. The workflow development unit 304 constructs a prompt for the completion language model 124 to obtain the workflow for the task recommendation or recommendations provided by the task identification unit 302. The completion language model 124 generates a workflow that includes the executable code that performs the actions of the workflow in the target application 210. The workflow development unit 304 provides the workflow generated by the workflow testing unit 306 for testing in some implementations before the workflow is provided to the client-side proxy 116 for execution.

FIG. 3C provides an example workflow in which task recommendations have been linked to actions and executable code. The output shown in FIG. 3C is a non-limiting example of the output of the workflow development unit 304. The workflows identified and format of the output may differ in other implementations.

The workflow development unit 304 can concatenate multiple workflows together for complex multitask workflows. In a non-limiting example, a task recommendation generated by the task identification unit 302 is "fill out and submit purchase order form" which involves multiple actions to complete. The workflow development unit 304 creates multiple workflows in response to the task recommendation, including actions for accessing the data for the form, inputting the data into the fields of the form, clicking on the submit button of the form. Each of these workflows may include multiple actions to be performed and the corresponding executable code is generated for each action. A technical benefit of this approach is that the UI structure grounding framework 192 can perform complex tasks on the target application in response to a natural language prompt. This approach can be used to perform actions in response to a user inputting a natural language prompt to perform a task, in response to a task suggested by the task identification unit 302 based on the user interface of the target application 210, and/or in response to a natural language query to create a complex test of the test application that can be used to test the functionality of the target application.

The workflow testing unit 306 tests the executable code of the workflow to ensure that the executable code is correct. The executable code generated by the completion language model 124 may include errors in some instances even though the workflow development unit 304 uses prompt construction and RAG to increase the likelihood of the completion language model 124 generating the correct and functional executable code. For implementations in which the user interface of the target application is based on a web page or web application, the workflow testing unit 306 generates a shadow DOM representation of the web page or web application in a sandbox environment on the application services platform 110. The workflow testing unit 306 verifies that the executable code of the workflow is syntactically correct, that the target elements of the executable code can be located in the shadow DOM representation of the application, and the action holds expected results. If workflow testing unit 306 determines that there are errors in the executable code, the workflow testing unit 306 requests that the workflow development unit 304 regenerate the workflow. The workflow testing unit 306 attempts to validate the revised workflow up to a predetermined maximum number of retries. If the revised workflow is validated by the workflow testing unit 306, the workflow is provided to the client-side proxy 116. Otherwise, if the revised workflow cannot be validated and the maximum number of retries is reached, the workflow testing unit 306 notifies the client-side proxy 304 that the workflow cannot be generated. The client-side proxy 116 may present an indication that an error occurred on the user interface of target application 210 and/or other user interface on the client device 105 to notify the user that an error has occurred.

FIGS. 4A-4F are diagrams showing an example user interface 400 of a target application 210 that implements an AI driven assistant according to the techniques disclosed herein. As discussed in the preceding examples, the target application may be a native application on the client device 105, such as the native application 114. The target application may also be a browser application on the client device 105, such as the browser application 112, which is being used to display a web page or content from a web application, such as but not limited to the web application 190.

FIG. 4A shows an example of the user interface 400 of the target application in which the AI driven assistant is presented in a pane 402. In other implementations, the AI driven assistant may be presented as a separate window or separate application operating on the client device 105. In the example implementation shown in FIG. 4A, the assistant has prompted the user to select a profile that represents one of the user personas supported by the assistant. As discussed in the preceding examples, the indication of the user persona enables the UI structure grounding framework 192 to make task recommendations relevant to the style of usage of the of the target application. For example, an e-commerce shopping is likely to find task recommendations that make shopping on the target application 210 more efficient, while a researcher is likely to find task recommendations related to downloading content and identifying related research more useful. The example personas shown in this example are merely a non-limiting example of the types of personas that may be supported. The specific personas supported may vary from implementation to implementation. The user may click on or otherwise activate the control associated with one of the personas to cause the client-side proxy 116 to send an indication to the UI structure grounding framework 192.

FIG. 4B shows an example of the user interface 400 for which the user selected the researcher persona. The UI structure grounding framework 192 generated a set of task recommendations based on the user interface 400 of the target application 210. The task recommendations generated by the UI structure grounding framework 192 are presented in the assistant pane 402. The user can click on or otherwise actuate these representations to cause the client-side proxy 116 to execute the associated executable code. As discussed in the preceding examples, the application interoperation unit 208 of the client-side proxy executes the executable code associated with the selected task recommendation. In implementations in which the target application 210 is implemented by the native application 114 of the client device, and the user interface testing framework unit 212 executes the executable code on the native application 114. In implementations in which the target application 210 is the browser application 112, the browser application unit 214 utilizes a browser API that causes the browser application 112 to perform actions on the content of the web page or web application being presented on the browser application 112.

FIG. 4C shows an example of the user interface 400 in which the assistant pane 402 includes a prompt input field 404. The prompt input field 404 allows the user to enter a natural language description of a new task that the user would like to add to the assistant pane 402. The natural language prompt, the user interface images and/or video frames, and the user interface structure are obtained by the client-side proxy 116 and processed by the UI structure grounding framework 192 as discussed in the preceding examples. However, the task identification unit 302 generates a task recommendation specifically associated with the natural language prompt rather than attempting to identify and rank task recommendations based on the images of the user interface. FIG. 4D shows an example of the user interface 400 having been updated to include the new task.

Figure 4E:
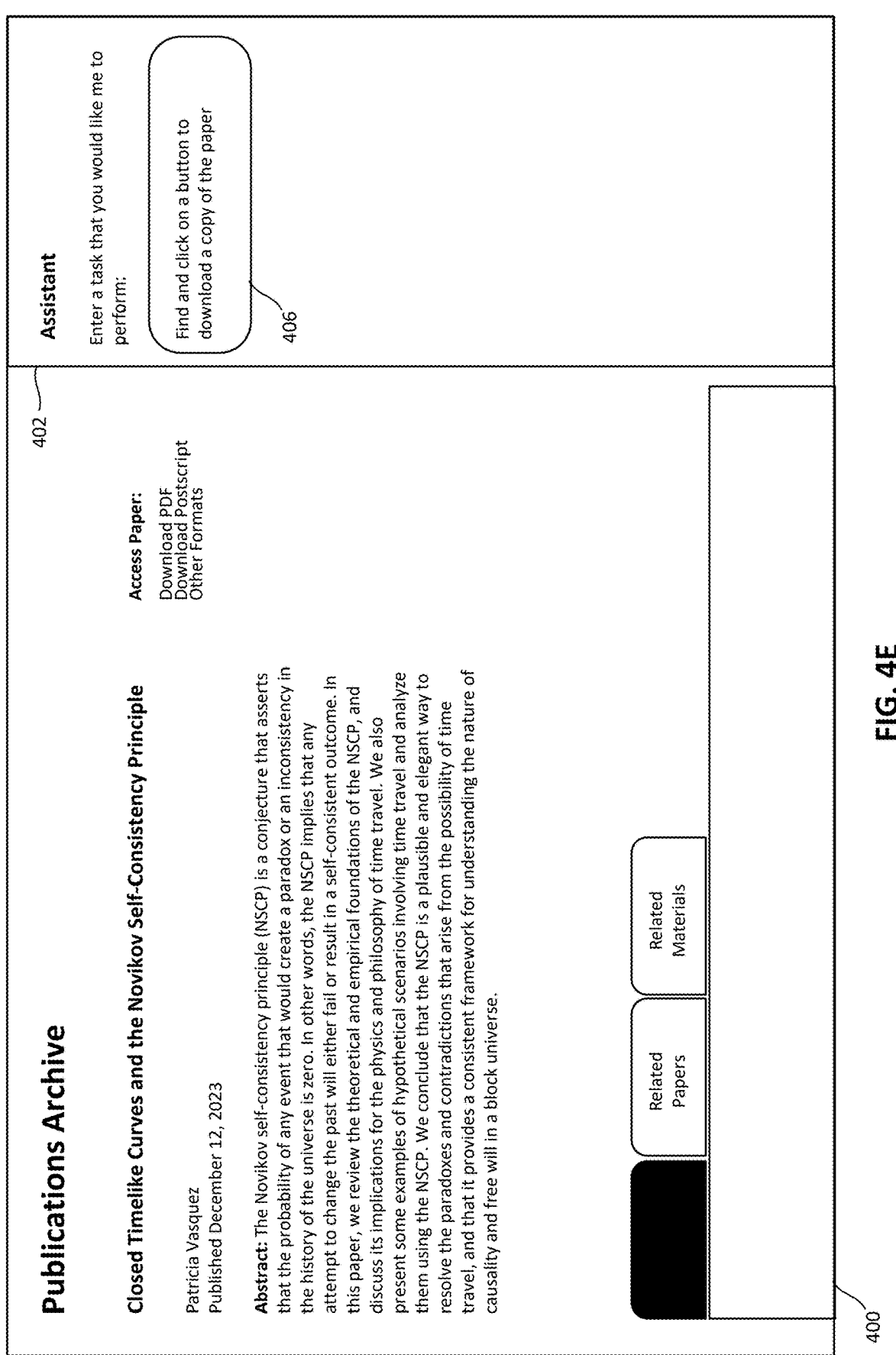

FIG. 4E shows another example of the user interface 400 in which the assistant does not proactively present task recommendations as shown in FIGS. 4B-4D. Instead, the user inputs a natural language query in the prompt input field 406, and the natural language query is processed as indicated above for the natural language query in FIG. 4C. If the UI structure grounding framework 192 is able generate a task recommendation based on the natural language query, the task recommendation is presented on the assistant pane 402 by the client-side proxy 116.

FIG. 4F shows another implementation of the user interface 400 in which the assistant pane is being used to implement tests on the target application 210. In this implementation, the user enters a natural language prompt in the prompt field 420 describing the test that the user would like to perform. The test can include performing a task that includes one or more actions via the user interface 400 of the target application 210. In a non-limiting example, the user might enter a prompt "Navigate to the web page under test, then add 2 random books to the cart, wait 5 seconds and finally validate that checkout page lists all the items" when designing a test for an e-commerce application.

The natural language query is processed as indicated above for the natural language query in FIGS. 4C and 4D. If the UI structure grounding framework 192 is able generate a task recommendation based on the natural language query, the task recommendation is presented on the assistant pane 402 by the client-side proxy 116. The user may then click on or otherwise activate the representation of the task recommendation in order to perform the test on the target application 210. The client-side proxy 116 may include a control that enables the user to save the task recommendation in a persistent memory of the client device 105 and/or the application services platform 110 to enable the user to execute the test again later and/or to add the test to suite of tests used to test the target application 210.

FIG. 5A is a flow chart of another example process 500 for automatically obtaining a contextually relevant frame for an image according to the techniques disclosed herein. The process 500 can be implemented by the UI structure grounding framework 192 of the application services platform 110 as discussed in the preceding examples.

The process 500 includes an operation 502 of obtaining an image of a user interface of an application and a textual representation of a structure of the user interface from a client-side proxy on a client device. As discussed in the preceding examples, the content capture unit 202 obtains one or more images and/or one or more frames of video of the user interface of the target application 210 and provide the one or more images or one or more frames to the UI structure grounding framework 192.

The process 500 includes an operation 504 of analyzing the image of the user interface using a vision language model 122 to obtain one or more task recommendations associated with the user interface. The task identification unit 302

The process 500 includes an operation 506 of analyzing the textual representation of the structure of the user interface and the one or more task recommendations associated with the user interface using a completion language model 124 to generate one or more workflows. Each workflow of the one or more workflows is associated with a task recommendation of the one or more task recommendations and comprising one or more actions and executable code to perform the one or more actions in the application. As discussed in the preceding examples, the workflow development unit 304 generates a workflow for each task recommendation using the completion language model 124 to identify one or more actions associated with task recommendation and executable code for executing these actions.

The process 500 includes an operation 508 of providing the one or more workflows to the client-side proxy 116 and an operation 510 of causing the client-side proxy to present a representation of each task recommendation of the set of task recommendations on a user interface 400 of the application. The client-side proxy 116 can present the representation of the task recommendation as shown in FIGS. 4B-4D.

The process 500 includes an operation 512 of receiving an indication that the representation of a task recommendation of the one or more task representations has been actuated on the user interface 400 and an operation 514 of executing the executable code associated with the task recommendation on the application. The application interoperation unit 208 of the client-side proxy 116 executes the code on the target application 210.

FIG. 5B is a flow chart of another example process 540 for automatically obtaining a contextually relevant frame for an image according to the techniques disclosed herein. The process 540 can be implemented by the frame generation and selection pipeline 192 shown in FIG. 3A.

The process 500 includes an operation 542 of obtaining an image of a user interface of an application and a textual representation of a structure of the user interface at a client-side proxy on a client device. The content capture unit 202 of the client-side proxy 116 obtains the one or more images and/or frames and the textual representation of the structure of the user interface.

The process 500 includes an operation 544 of analyzing the textual representation of the structure of the user interface using client-side proxy to trim the textual representation of the structure of the user interface to generate a trimmed representation of the structure of the user interface. The structure trimming unit 204 of the client-side proxy 116 trims the textual representation of the structure of the user interface as discussed in the preceding examples.

The process 500 includes an operation 546 of providing the image of the user interface and the trimmed textual representation of the structure of the user interface to a user interface structure grounding framework that uses a vision language model and a completion language model to generate a set of one or more task recommendations. Each task recommendation is associated with one or more actions to be performed on the user interface of the application and executable code for performing the one or more actions. As discussed in the preceding examples, the workflow development unit 304 generates a workflow for each task recommendation using the completion language model 124 to identify one or more actions associated with task recommendation and executable code for executing these actions.

The process 500 includes an operation 548 of presenting a representation of each task recommendation of the set of task recommendations on a user interface of the application. The client-side proxy 116 can present the representation of the task recommendation as shown in FIGS. 4B-4D.

The process 500 includes an operation 550 of receiving an indication that the representation of a task recommendation of the one or more task representations has been actuated on the user interface and an operation 542 of executing the executable code associated with the task recommendation on the application. The application interoperation unit 208 of the client-side proxy 116 executes the executable code on the application in response to the user click on or otherwise activating the task recommendation.

FIGS. 8A-8D are example of flow diagram showing how a natural language prompt input by a user is processed according to the techniques herein. The example prompts and few shot examples shown in FIGS. 8A-8D are non-limiting examples. Other implementations may use different prompts and different few shot examples. Furthermore, the order of the processing may be different depending upon the natural language prompt input by the user.

The process includes example prompts constructed for the AI models and few-shot learning examples that provide context to the models. FIG. 8A shows an example natural language prompt 802 that is input by a user in a prompt field on the target application 210 of the client device 105, such as the prompt field 406 shown on FIG. 4D. In this example, natural language prompt requests that the assistant help find a research paper and download the paper in a specific format. The natural language prompt 802 is provided to the UI structure grounding framework 192 by the client-side proxy 116. After submitting the natural language prompt 802, the process continues with the example prompt 804 and few shot learning examples. The prompt 804 is constructed by the task identification unit 302 using the techniques discussed in the preceding examples. The task identification unit 302 provides the prompt and few shot examples 804 as an input to the vision language model 122. The prompt 804 provides context for the model to understand the user's end goal of downloading a copy of the paper and generating the executable code for accomplishing this task. The process continues with the construction of the prompt 806 if the content to be analyzed is textual based otherwise, the process continues with the construction of the prompt 808 shown in FIG. 8B. The prompt 806 instructs the completion language model 124 to generate a summary of the web page. The process continues with the construction of the prompt 808 shown in FIG. 8B. The prompt 808 instructs the vision language model 122 model to analyze the current state of the web page and to determine a next action for reaching the user's goals.

The example prompt 806 provides a natural language prompt and few shot examples to the vision language model 122 to instruct the completion language model 124 to extract a succinct summary of the content of a web site and the main purpose of the web site. The process then continues with the prompt 810 which causes the completion language model 124 to generate the executable code to implement the next action. The process then continues with prompt 814 shown in FIG. 8D, which is generated by the workflow testing unit 306, to test whether the executable code is syntactically correct, that the target elements of the executable code can be located in the shadow DOM representation of the web page 816, and the action holds expected results. The prompt 810 is provided to the completion language model 124. The process continues with prompt 812 shown in FIG. 8C, which causes the completion language model 124 to evaluate the state of the web page to determine whether user's goal has been achieved. The process continues with the prompt 818, which prompts the completion language model 124 to refine the user's goals for the next action. The process then continues with the prompt 808 if the results are visual or the prompt 806 if the results are textual.

The detailed examples of systems, devices, and techniques described in connection with FIGS. 1-5B and 8A-8D are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-5B and 8A-8D are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
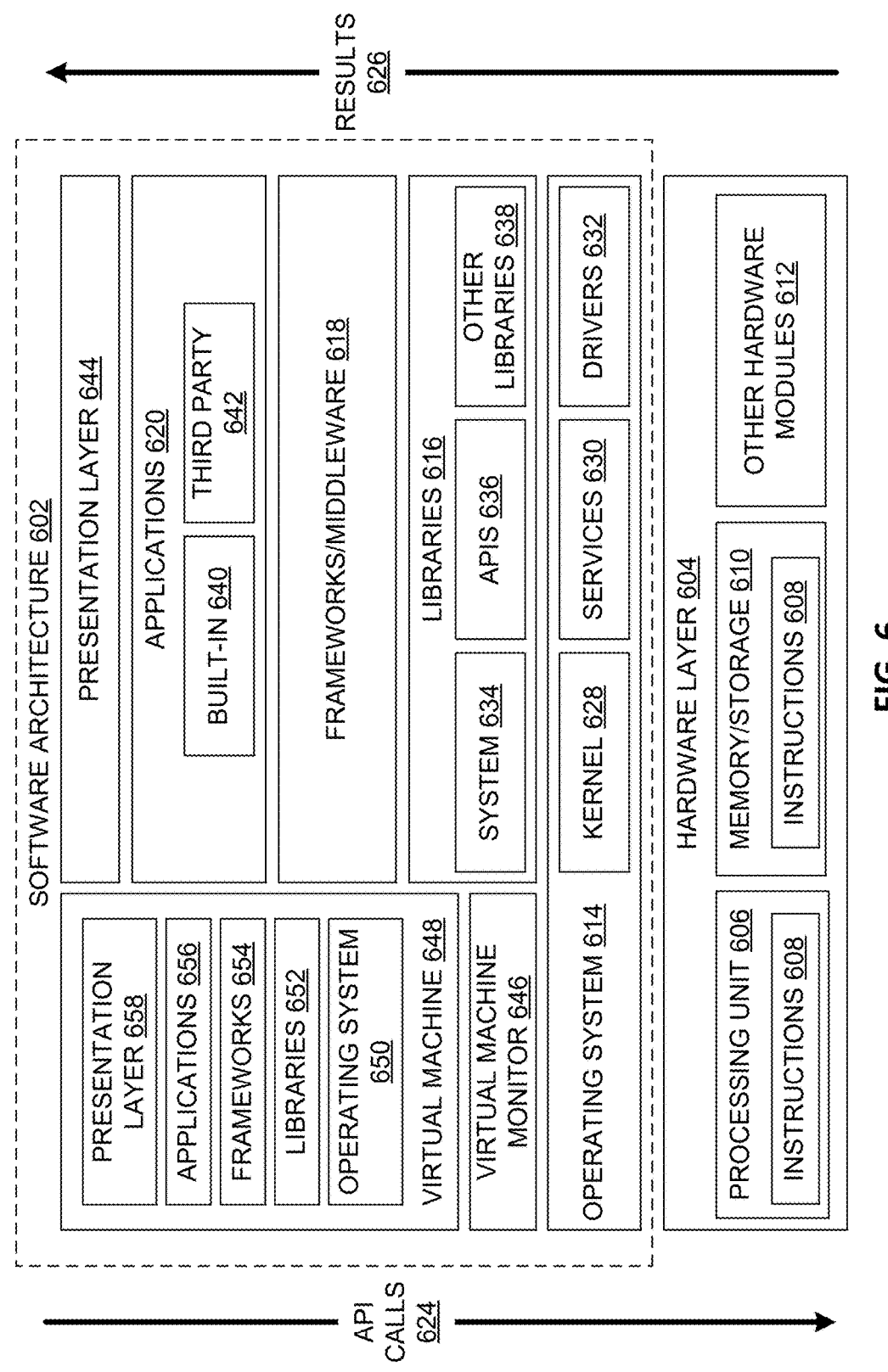
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
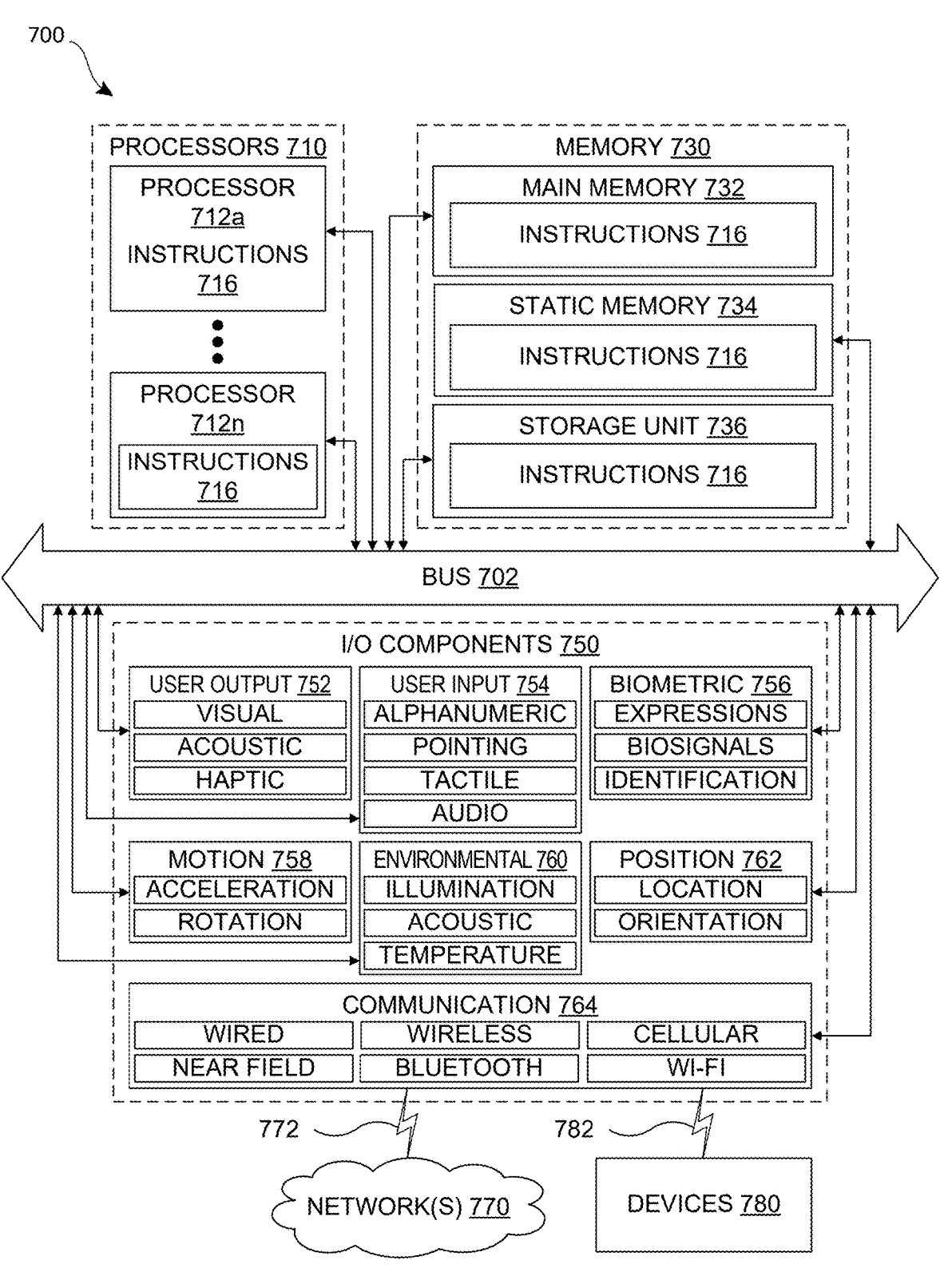
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multicore processor including cores that may execute instructions contemporaneously. Although FIG. 7 shows multiple processors, the machine 700 may include a single processor with a single core, a single processor with multiple cores (for example, a multicore processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS)

receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and a memory storing executable instructions that, when executed, cause the processor alone or in combination with other processors to perform operations of:

obtaining an image of a user interface of an application and a textual representation of a structure of the user interface from a client-side proxy on a client device;

analyzing the image of the user interface using a vision language model to obtain one or more task recommendations associated with the user interface;

analyzing the textual representation of the structure of the user interface and the one or more task recommendations associated with the user interface using a completion language model to generate one or more workflows, each workflow of the one or more workflows being associated with a task recommendation of the one or more task recommendations and comprising one or more actions and executable code to perform the one or more actions in the application;

providing the one or more workflows to the client-side proxy;

causing the client-side proxy to present a representation of each task recommendation of the one or more task recommendations on the user interface of the application;

receiving an indication that the representation of a task recommendation of the one or more task recommendations has been actuated on the user interface; and executing the executable code associated with the task recommendation on the application.

2. The data processing system of claim 1, wherein the memory further includes instructions configured to cause the processor alone or in combination with other processors to perform operations of:

analyzing the textual representation of the structure of the user interface to trim the textual representation of the structure of the user interface to generate a trimmed textual of the structure of the user interface, wherein analyzing the textual representation of the structure of the user interface and one or more task recommendations associated with the user interface further comprises analyzing the trimmed textual representation of the structure of the user interface and one or more task recommendations.

3. The data processing system of claim 1, wherein the memory further includes instructions configured to cause the processor alone or in combination with other processors to perform operations of:

concatenating multiple task recommendations to generate a multitask workflow;

presenting a second representation of the multitask workflow on the user interface;

receiving an indication that the second representation has been actuated on the user interface; and executing the executable code associated with the multitask workflow.

4. The data processing system of claim 1, wherein the memory further includes instructions configured to cause the processor alone or in combination with other processors to perform operations of:

determining an indication of a persona associated with a user of the application, and wherein analyzing the textual representation of the structure of the user interface and the one or more task recommendations associated with the user interface using the completion language model to generate one or more workflows further comprises analyzing the indication of the persona associated with the user to generate the one or more workflows.

5. The data processing system of claim 1, wherein the application is a native application on the client device, wherein the executable code comprises executable code for an automated testing framework, and wherein executing the executable code comprises executing the executable code using the automated testing framework.

6. The data processing system of claim 1, wherein the application is a browser application on the client device, wherein the executable code comprises executable code to be injected into the browser application for execution on a web page, and wherein executing the executable code comprises injecting the executable code into the browser application.

7. The data processing system of claim 1, wherein the vision language model is implemented using a Generative Pre-trained Transformer 4 with Vision (GPT-4V) model.

8. The data processing system of claim 1, wherein the completion language model is implemented using a GPT-3.5-turbo-instruct model.

9. The data processing system of claim 1, wherein the memory further includes instructions configured to cause the processor alone or in combination with other processors to perform operations of:

validating the executable code associated with each action of the one or more actions for each workflow of the one or more workflows by testing the executable code on a copy of the user interface of the application.

10. A method implemented in a data processing system for artificial intelligence driven analysis of a user interface of an application, the method comprising:

obtaining an image of a user interface of the application and a textual representation of a structure of the user interface from a client-side proxy on a client device;

analyzing the image of the user interface using a vision language model to obtain one or more task recommendations associated with the user interface;

analyzing the textual representation of the structure of the user interface and the one or more task recommendations associated with the user interface using a completion language model to generate one or more workflows, each workflow of the one or more workflows being associated with a task recommendation of the one or more task recommendations and comprising one or more actions and executable code to perform the one or more actions in the application;

providing the one or more workflows to the client-side proxy;

causing the client-side proxy to present a representation of each task recommendation of the one or more task recommendations on the user interface of the application;

receiving an indication that the representation of a task recommendation of the one or more task recommendations has been actuated on the user interface; and executing the executable code associated with the task recommendation on the application.

11. The method of claim 10, further comprising:

analyzing the textual representation of the structure of the user interface to trim the textual representation of the structure of the user interface to generate a trimmed textual representation of the structure of the user interface, wherein analyzing the textual representation of the structure of the user interface and one or more task recommendations associated with the user interface further comprises analyzing the trimmed textual representation of the structure of the user interface and one or more task recommendations.

12. The method of claim 11, wherein the application is a native application on the client device, wherein the executable code comprises executable code for an automated testing framework, and wherein executing the executable code comprises executing the executable code using the automated testing framework.

13. The method of claim 11, wherein the application is a browser application on the client device, wherein the executable code comprises executable code to be injected into the browser application for execution on a web page, and wherein executing the executable code comprises injecting the executable code into the browser application.

14. The method of claim 10, wherein the vision language model is implemented using a Generative Pre-trained Transformer 4 with Vision (GPT-4V) model.

15. The method of claim 10, wherein the completion language model is implemented using a GPT-3.5-turbo-instruct model.

16. The method of claim 10, further comprising:
validating the executable code associated with each action of the one or more actions for each workflow of the one or more workflows by testing the executable code on a copy of the user interface of the application.

17. A data processing system comprising:
a processor; and
a memory storing executable instructions that, when executed, cause the processor alone or in combination with other processors to perform operations of:
obtaining an image of a user interface of an application and a textual representation of a structure of the user interface at a client-side proxy on a client device;
analyzing the textual representation of the structure of the user interface using client-side proxy to trim the textual representation of the structure of the user interface to generate a trimmed textual representation of the structure of the user interface;

providing the image of the user interface and the trimmed textual representation of the structure of the user interface to a user interface structure grounding framework that uses a vision language model and a completion language model to generate a set of one or more task recommendations, wherein each task recommendation is associated with one or more actions to be performed on the user interface of the application and executable code for performing the one or more actions;
presenting a representation of each task recommendation of the set of one or more task recommendations on a user interface of the application;
receiving an indication that the representation of a task recommendation of the set of one or more task recommendations has been actuated on the user interface; and
executing the executable code associated with the task recommendation on the application.

18. The data processing system of claim 17, wherein the application is a native application on the client device, wherein the executable code comprises executable code for an automated testing framework, and wherein executing the executable code comprises executing the executable code using the automated testing framework.

19. The data processing system of claim 17, wherein the application is a browser application on the client device, wherein the executable code comprises executable code to be injected into the browser application for execution on a web page, and wherein executing the executable code comprises injecting the executable code into the browser application.

20. The data processing system of claim 17, wherein the vision language model is implemented using a Generative Pre-trained Transformer 4 with Vision (GPT-4V) model, and wherein the completion language model is implemented using a GPT-3.5-turbo-instruct model.

* * * * *